(12) United States Patent
Wallentin et al.

(10) Patent No.: US 11,665,618 B2
(45) Date of Patent: May 30, 2023

(54) METHODS OF DETERMINING ACCESS CATEGORIES AND/OR ESTABLISHMENT CAUSES AND RELATED DEVICES

(71) Applicant: TELEFONAKTIEBOLAGET LM ERICSSON (PUBL), Stockholm (SE)

(72) Inventors: Pontus Wallentin, Linköping (SE); Janne Peisa, Espoo (FI); Hans Krister Mikael Sällberg, Lund (SE); Ivo Sedlacek, Hovorcovice (CZ); Jens Bergqvist, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/957,278

(22) PCT Filed: Jan. 15, 2019

(86) PCT No.: PCT/IB2019/050325
§ 371 (c)(1),
(2) Date: Jun. 23, 2020

(87) PCT Pub. No.: WO2019/142104
PCT Pub. Date: Jul. 25, 2019

(65) Prior Publication Data
US 2021/0007041 A1   Jan. 7, 2021

Related U.S. Application Data

(60) Provisional application No. 62/618,806, filed on Jan. 18, 2018.

(51) Int. Cl.
*H04W 48/02* (2009.01)
*H04W 76/10* (2018.01)
(Continued)

(52) U.S. Cl.
CPC .......... *H04W 48/02* (2013.01); *H04W 8/18* (2013.01); *H04W 48/16* (2013.01);
(Continued)

(58) Field of Classification Search
CPC ..... H04W 48/02; H04W 48/06; H04W 48/16; H04W 88/02; H04W 8/18;
(Continued)

(56) References Cited

U.S. PATENT DOCUMENTS

2014/0003354 A1*  1/2014  Ekici et al. ............... 370/329
2014/0099912 A1   4/2014  Lee et al.
(Continued)

FOREIGN PATENT DOCUMENTS

| CN | 105612788 A | 5/2016 |
| JP | 2020519041 A | 6/2020 |
| RU | 2596602 C2 | 9/2016 |

OTHER PUBLICATIONS

3rd Generation Partnership Project, "3rd Generation Partnership Project; Technical Specification Group Services and System Aspects; Service requirements for the 5G system; Stage 1 (Release 15)", Technical Specification, 3GPP TS 22.261 V15.3.0, pp. 1-52, Dec. 2017, 3GPP, France.

Mediatek Inc., "Discussion on Unified Access Control in 5GS", 3GPP TSG CT WG1 Meeting #103, Spokane, Washington, Apr. 3-7, 2017, pp. 1-5, C1-171579, 3GPP.
(Continued)

*Primary Examiner* — Meless N Zewdu
(74) *Attorney, Agent, or Firm* — Sage Patent Group

(57) ABSTRACT

Methods of operating a user equipment UE are discussed. An access category may be determined from a plurality of access categories and at least one access identity may be determined from a plurality of access identities to be applied for an access attempt. An establishment cause may be determined for the access attempt based on the access
(Continued)

category determined from the plurality of access categories and based on the at least one access identity from the plurality of access identities. A connection request message for the access attempt may be transmitted to a wireless communication network, with the connection request message including the establishment cause determined based on the access category and based on the at least one access identity. Related devices are also discussed.

18 Claims, 30 Drawing Sheets

(51) Int. Cl.
*H04W 8/18* (2009.01)
*H04W 48/16* (2009.01)
*H04W 74/08* (2009.01)
*H04W 88/02* (2009.01)

(52) U.S. Cl.
CPC ....... *H04W 74/0833* (2013.01); *H04W 76/10* (2018.02); *H04W 88/02* (2013.01)

(58) Field of Classification Search
CPC ............ H04W 74/0833; H04W 76/10; H04W 74/08; H04W 28/0835; H04W 48/00; H04W 48/08; H04W 48/20; H04W 48/18; H04W 88/00; H04W 88/08; H04W 88/085; H04W 88/10; H04W 88/12; H04W 88/18; H04W 76/00; H04W 76/11; H04W 64/00; H04W 72/082; H04W 72/04; H04W 72/12; H04W 28/0289; H04W 72/0453; H04W 72/046; H04W 72/048; H04W 72/0486; H04W 72/08; H04W 72/00; H04Q 3/0083; H04Q 2213/13543; H04Q 2213/13544
See application file for complete search history.

(56) References Cited

U.S. PATENT DOCUMENTS

| | | | |
|---|---|---|---|
| 2018/0213466 A1* | 7/2018 | Kotecha et al. | H04W 48/02 |
| 2019/0045577 A1* | 2/2019 | Kim et al. | H04W 76/50 |
| 2019/0082376 A1* | 3/2019 | Hong et al. | H04W 48/02 |
| 2019/0150061 A1* | 5/2019 | Ishii | H04W 48/06 |
| 2019/0174392 A1* | 6/2019 | Chun et al. | H04W 48/02 |
| 2019/0174536 A1* | 6/2019 | Han et al. | H04W 74/002 |
| 2020/0296653 A1* | 9/2020 | Huang | H04W 40/24 |

OTHER PUBLICATIONS

Ericsson et al., "5G UAC—update of alternative 3", 3GPP TSG-CT WG1 Meeting #108, Gothenburg, Sweden, Jan. 22-26, 2018, pp. 1-11, C1-180028, 3GPP.
Ericsson, "Access Control and Slicing", 3GPP TSG-RAN WG2 #99bis, Prague, Czech Republic, Oct. 9-13, 2017, pp. 1-3, R2-1710197, 3GPP.
Ericsson, "AS-NAS functional division for Unified Access Control", 3GPP TSG-RAN WG2 NR AH#3, Vancouver, Canada, Jan. 22-26, 2018, pp. 1-8, R2-1800317, 3GPP.
Ericsson, "Establishment causes for NR", 3GPP TSG-RAN WG2 NR AH#3, Vancouver, Canada, Jan. 22-26, 2018, pp. 1-9, R2-1800321, 3GPP.
Intel Corporation, "Email discussion report on [NR-AH1801#07][NR] Reply LS to CT1 on AC", 3GPP TSG RAN WG2 Meeting #101, Athens, Greece, Feb. 26-Mar. 2, 2018, pp. 1-34, R2-1802937, 3GPP.
Ericsson, "Proposed new establishment causes", 3GPP TSG-RAN WG2 #102, Busan, Republic of Korea, May 21-25, 2018, pp. 1-5, R2-1806759, 3GPP.
Ericsson, "Access Control for NR", 3GPP TSG RAN WG2#99, Berlin, Germany, Aug. 24-25, 2017, pp. 1-5, Tdoc R2-1708528, 3GPP.
Zte et al., "Consideration on access control in NR", 3GPP TSG-RAN WG2 NR Ad hoc 1801, Vancouver, Canada, Jan. 22-26, 2018, pp. 1-9, R2-1800458, 3GPP.
English summary of Chinese Office Action submitted in IDS filed on Jan. 18, 2023, 2 pages.

* cited by examiner

FIG. 3

```
BarringPerACDC-Category-r13 ::= SEQUENCE {
    acdc-Category-r13           INTEGER (1..maxACDC-Cat-r13),
    acdc-BarringConfig-r13      SEQUENCE {
        ac-BarringFactor-r13    ENUMERATED {
                                    p00, p05, p10, p15, p20, p25, p30, p40,
                                    p50, p60, p70, p75, p80, p85, p90, p95},
        ac-BarringTime-r13      ENUMERATED {s4, s8, s16, s32, s64, s128, s256, s512}
    }                           OPTIONAL  -- Need OP
}
```

FIG. 7A

| Access Identity number | UE configuration |
|---|---|
| 0 | UE is not configured with any parameters from this table |
| 1 (NOTE 1) | UE is configured for Multimedia Priority Service (MPS). |
| 2 (NOTE 2) | UE is configured for Mission Critical Service (MCS). |
| 3-10 | Reserved for future use |
| 11 (NOTE 3) | Access Class 11 is configured in the UE. |
| 12 (NOTE 3) | Access Class 12 is configured in the UE. |
| 13 (NOTE 3) | Access Class 13 is configured in the UE. |
| 14 (NOTE 3) | Access Class 14 is configured in the UE. |
| 15 (NOTE 3) | Access Class 15 is configured in the UE. |

FIG. 7B

NOTE 1: Access Identity 1 is used to provide overrides according to the subscription information in UEs configured for MPS. The subscription information defines whether an override applies to UEs within one of the following categories:

a) UEs that are configured for MPS;

b) UEs that are configured for MPS and are in the PLMN listed as most preferred PLMN of the country where the UE is roaming in the operator-defined PLMN selector list or in their HPLMN or in a PLMN that is equivalent to their HPLMN;

c) UEs that are configured for MPS and are in their HPLMN or in a PLMN that is equivalent to it.

NOTE 2: Access Identity 2 is used to provide overrides according to the subscription information in UEs configured for MCS. The subscription information defines whether an override applies to UEs within one of the following categories:

a) UEs that are configured for MCS;

b) UEs that are configured for MCS and are in the PLMN listed as most preferred PLMN of the country where the UE is roaming in the operator-defined PLMN selector list or in their HPLMN or in a PLMN that is equivalent to their HPLMN;

c) UEs that are configured for MCS and are in their HPLMN or in a PLMN that is equivalent to it.

NOTE 3: Access Identities 11 and 15 are valid in Home PLMN only if the EHPLMN list is not present or in any EHPLMN. Access Identities 12, 13 and 14 are valid in Home PLMN and visited PLMNs of home country only. For this purpose the home country is defined as the country of the MCC part of the IMSI.

FIG. 8A

| Access Category number | Conditions related to UE | Type of access attempt |
|---|---|---|
| 0 | All | MO signalling resulting from paging |
| 1 (NOTE 1) | UE is configured for delay tolerant service and subject to access control for Access Category 1, which is judged based on relation of UE's HPLMN and the selected PLMN. | All except for Emergency |
| 2 | All | Emergency |
| 3 | All except for the conditions in Access Category 1. | MO signalling resulting from other than paging |
| 4 | All except for the conditions in Access Category 1. | MMTEL voice |
| 5 | All except for the conditions in Access Category 1. | MMTEL video |
| 6 | All except for the conditions in Access Category 1. | SMS |
| 7 | All except for the conditions in Access Category 1. | MO data that do not belong to any other Access Categories |
| 8-31 | | Reserved standardized Access Categories |
| 32-63 (NOTE 2) | All | Based on operator classification |

FIG. 8B

NOTE 1: The barring parameter for Access Category 1 is accompanied with information that define whether Access Category applies to UEs within one of the following categories:
a) UEs that are configured for delay tolerant service;
b) UEs that are configured for delay tolerant service and are neither in their HPLMN nor in a PLMN that is equivalent to it;
c) UEs that are configured for delay tolerant service and are neither in the PLMN listed as most preferred PLMN of the country where the UE is roaming in the operator-defined PLMN selector list on the SIM/USIM, nor in their HPLMN nor in a PLMN that is equivalent to their HPLMN.

NOTE 2: When there are an Access Category based on operator classification and a standardized Access Category to both of which an access attempt can be categorized, and the standardized Access Category is neither 0 nor 2, the UE applies the Access Category based on operator classification. When there are an Access Category based on operator classification and a standardized Access Category to both of which an access attempt can be categorized, and the standardized Access Category is 0 or 2, the UE applies the standardized Access Category.

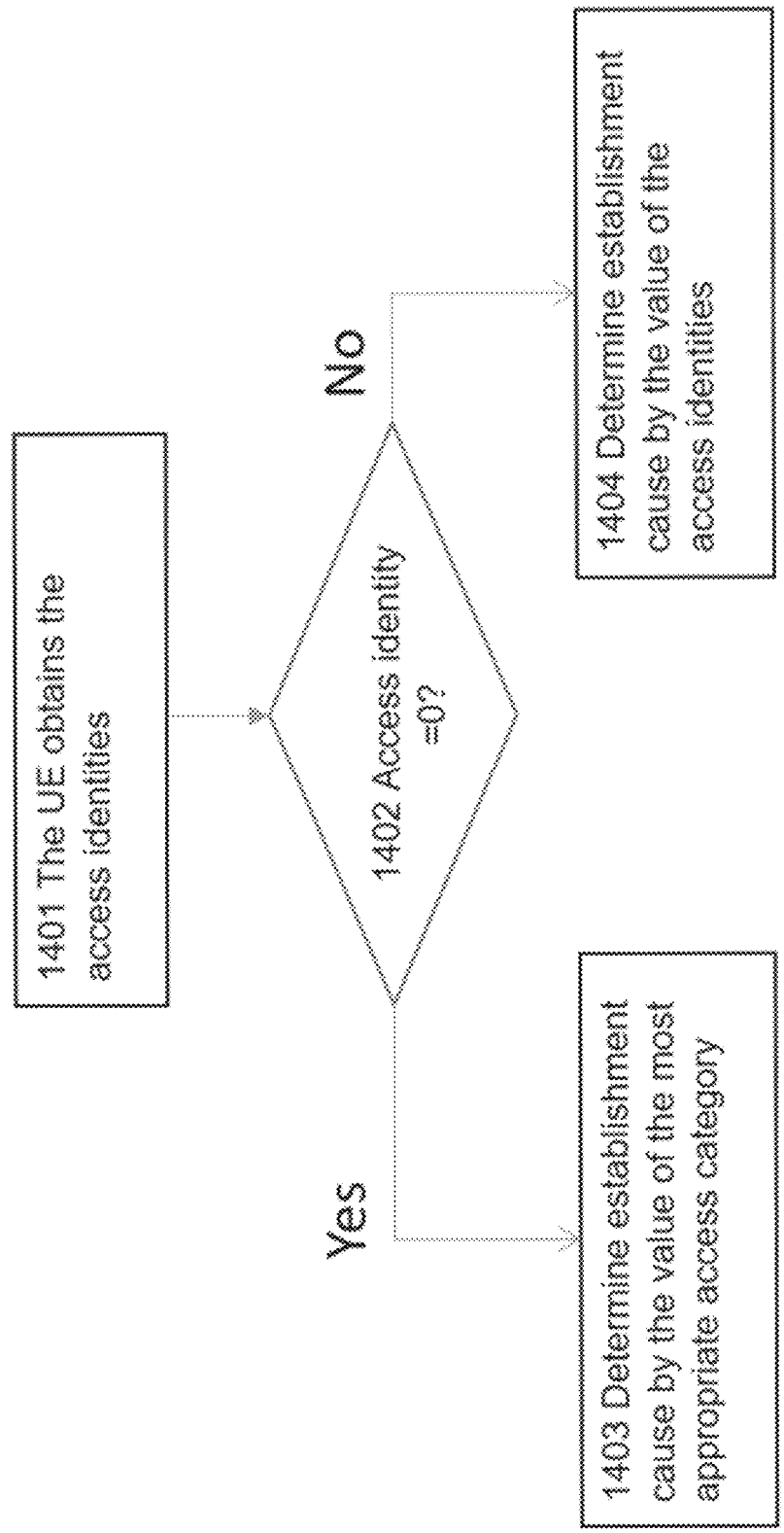

FIG. 15

| Access Category | Conditions related to UE | Type of access attempt | Establishment cause | |
|---|---|---|---|---|
| | | | MT | LE |
| 0 | | MO signalling resulting from paging | MT Access | MT Access |
| 1 | UE is configured for delay tolerant service | | Delay Tolerant Access | Delay Tolerant Access |
| 2 | | Emergency | Emergency | Emergency |
| 3 | | MO signalling resulting from other than paging | MO Signalling | MO Signalling |
| 4 | | MMTEL voice | MO Voice Call | MO Voice Call |
| 5 | | MMTEL video | MO Video call | |
| 6 | | SMS | MO SMS | MO Data |
| 7 | | MO data that do not belong to any other Access Categories | MO Data | MO Data |
| 8-31 | | Reserved | N.A. | N.A. |

FIG. 16

| Other application filter access category | Filter 1 | Filter 2 | Most applicable filter access category |
|---|---|---|---|
| 32 | DNN=18 | - | 7 |
| 33 | Slice=5 | - | 7 |
| 38 | Slice=8 | TCP dest port = 8820 | 1 |
| 45 | TCP port dest =8819 | - | 4 |
| 60 | - | - | 5 |

FIG. 17

| URSP rule precedence | Group 1 | Group 2 | Establishment cause |
|---|---|---|---|
| 32 | DNN=18 | - | MO Data |
| 33 | Slice=5 | - | MO Data |
| 38 | Slice=8 | TCP dest port = 8820 | Delay Tolerant Access |
| 45 | TCP port dest =8819 | - | MO Voice Call |
| 60 | - | - | MO Video call |

FIG. 18

| Operator-specific filters | Group 1 | Group 2 | Establishment cause |
|---|---|---|---|
| 32 | DNN = 18 | - | Operator-specific#8 |
| 33 | Slice = 5 | - | Operator-specific#8 |
| 38 | Slice = 8 | TCP dest port = 8820 | Operator-specific#9 |
| 45 | TCP port dest = 8819 | - | Operator-specific#10 |
| 60 | - | - | Operator-specific#11 |

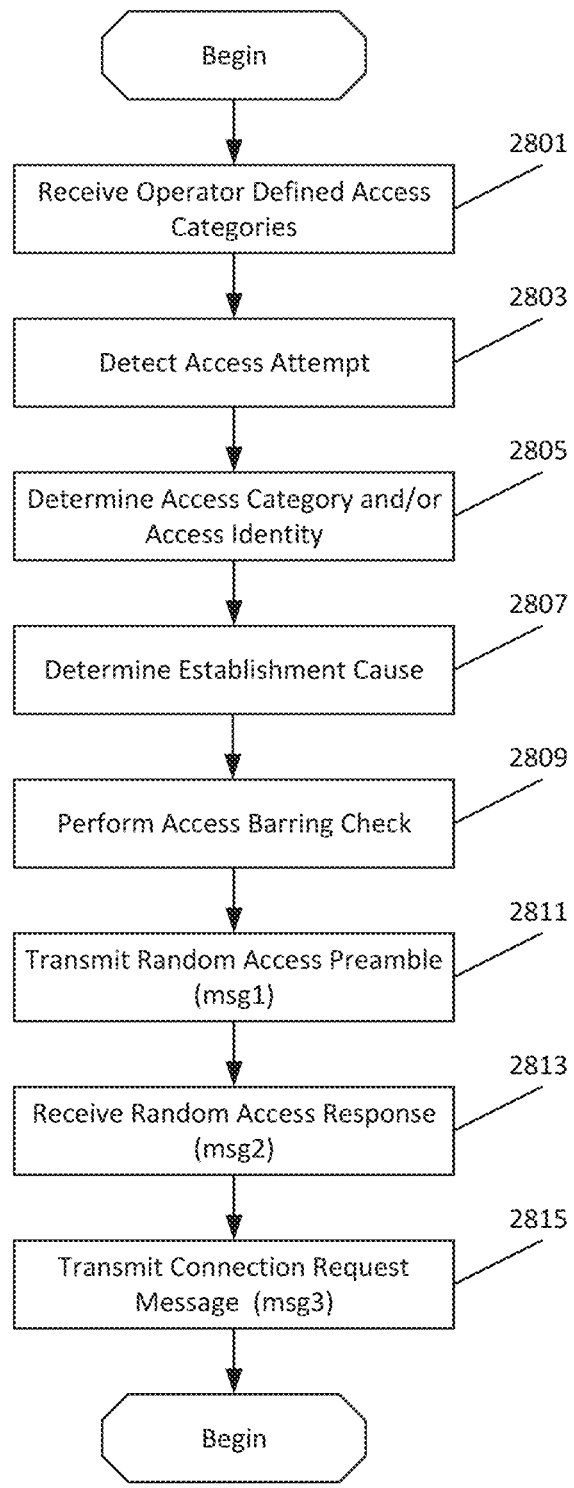

METHODS OF DETERMINING ACCESS CATEGORIES AND/OR ESTABLISHMENT CAUSES AND RELATED DEVICES

The present application is a 371 of International Application No. PCT/M2019/050325, filed Jan. 15, 2019, which claims the benefit of and priority to U.S. Provisional Patent Application No. 62/618,806, filed Jan. 18, 2018, entitled "METHODS OF DETERMINING ACCESS CATEGORIES AND/OR ESTABLISHMENT CAUSES AND RELATED DEVICES," the disclosures of which are hereby incorporated herein by reference in their entirety.

TECHNICAL FIELD

The present disclosure relates to communications, and more particularly, to wireless communications and related methods and devices.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

When performing access to a wireless communication system, a user equipment (UE) must signal to the network that it wants to acquire communication opportunities. There are many schemes for how this can be done. For example, a UE can utilize air-interface resources (e.g., times, frequencies) to send a short message that would indicate to the network that a UE wants to communicate. Further details about a certain communication need can then occur in subsequent communication.

The event which triggers a UE to perform a request to access a wireless communication system may, for example, be: a need for an application, such as a software module in the UE, to transmit uplink user data, and/or receive downlink user data; a need to exchange signaling messages with a network node; or alternatively, a combination of both.

Consider the simplified wireless network 100 illustrated in FIG. 1, with a UE (102), which communicates with an access node (104), which in turn is connected to a network node (106).

For wireless communication systems pursuant to 3GPP EPS/LTE standard specifications, the access node 104 corresponds typically to an Evolved NodeB (eNB) and the network node 106 corresponds typically to either a Mobility Management Entity (MME) and/or a Serving Gateway (SGV). However, these examples are for illustrative purposes, and access node 104 and network node 106 may correspond to any network node suitable for performing the required functionality.

In 3GPP LTE, a request for communication, when the UE is in idle mode, also known as RRC IDLE state, is performed by initiating a random access procedure, followed by an RRC Connection Establishment procedure. The request for communication may be triggered, for example, by a request to setup a new data session, an outgoing voice call, answer to paging, an application in the UE needs to send a data packet belonging to an already establish data session, or a NAS signaling procedure such a Tracking Area Update. This trigger is first identified by the Non-Access Stratum layers in the UE which forwards a request to the Radio Resource Control (RRC) layer in the UE, which in turn initiates the actual procedure to perform random access and RRC connection establishment.

Please see FIG. 2 for a high level flow diagram showing random access and RRC connection establishment. This sequence starts with a transmission of a Random Access Preamble (201), also known as "msg1", on specifically allocated channels or resources. This random access preamble is, when received by a base station or eNB, followed by a random access response (202), also known as "msg2", that includes an allocation of resources for continued signaling. In this case, the continued signaling is the RRC Connection Request (203), also known as "msg3" which is the first message in the RRC Connection Establishment procedure.

The RRC Connection Request (203) message typically includes, for example an identity of the UE or some other reference, such as a random number, which is used in the response from the network in RRC Connection Setup (204) to refer to this particular request for a connection.

FIG. 2 illustrates random access and RRC connection establishment in 3GPP LTE. As is easily realized, an access attempt will cost air interface resources. Both the initial message (201, Preamble) as well as resources for further signalling (202-205) will add to the wireless network load, simply to configure and setup communication resources for subsequent data transfer. It should be noted that even further communication is needed with network entities before any communication can take place, but these steps are omitted from FIG. 2.

In some cases, such as during high load, the network may deny the request for an RRC connection by the UE. In such a case, it may send an RRC Connection Reject message instead of the RRC Connection Setup (204). When the UE receives such a rejection it will stay in idle mode, possibly during a time indicated by the reject message before performing a new request. In order for the network to be able to prioritize between requests for RRC connection, for example, to give priority to emergency calls compared to ordinary calls, the RRC Connection Request message (203) also contains a cause, or reason, for establishing the connection, what is in 3GPP defined as the RRC Establishment Cause. In LTE, the UE selects an RRC Establishment Cause value among seven specified values (these as specified in 3GPP TS 36.331): emergency, highPriorityAccess, mt-Access, mo-Signalling, mo-Data, delayTolerantAccess, mo-VoiceCall. Which RRC Establishment Cause value that is selected by the UE (i.e. the trigger and/or NAS signalling procedure) is specified in 3GPP TS 24.301 Annex D.

Going forward, additional establishment cause values may be desired. Accordingly, there may be a demand for more efficient ways to determine and/or communicate establishment cause values and/or related information.

SUMMARY

According to some embodiments of inventive concepts, methods may he provided to operate a user equipment UE.

An access category may be determined from a plurality of access categories and at least one access identity may be determined from a plurality of access identities to be applied for an access attempt. An establishment cause may be determined for the access attempt based on the access category determined from the plurality of access categories and based on the at least one access identity from the plurality of access identities. A connection request message for the access attempt may be transmitted to a wireless communication network, with the connection request message including the establishment cause determined based on the access category and based on the at least one access identity.

Determining an establishment cause according to some embodiments of inventive concepts may reduce a size of information for an establishment cause that is included in a connection request message and/or may facilitate operator defined access categories.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 3 is a table illustrating ACDC barring information in LTE;

FIGS. 7A and 7B provide a table illustrating access categories for 5G unified access control;

FIGS. 8A and 8B provide a table illustrating access identities for 5G Unified access control;

FIG. 14 is a is a flow chart illustrating operations used to map an appropriate access category and access identities to an establishment cause according to some embodiments of inventive concepts;

FIG. 15 is a table illustrating examples of mapping appropriate access category values to establishment causes according to some embodiments of inventive concepts;

FIG. 16 illustrates a table provided in the UE that may be used to configure access categories according to operator-specific access category rules according to some embodiments of inventive concepts;

FIG. 17 illustrates a table provided in the UE that may be used to configure establishment causes according to operator-specific access category rules according to some embodiments of inventive concepts;

FIG. 18 illustrates a table provided in the UE that may be used to configure establishment causes according to operator-specific access category rules according to some embodiments of inventive concepts;

FIG. 28 is a flow chart illustrating operations of a UE according to some embodiments of inventive concepts.

DETAILED DESCRIPTION

Figure 1:
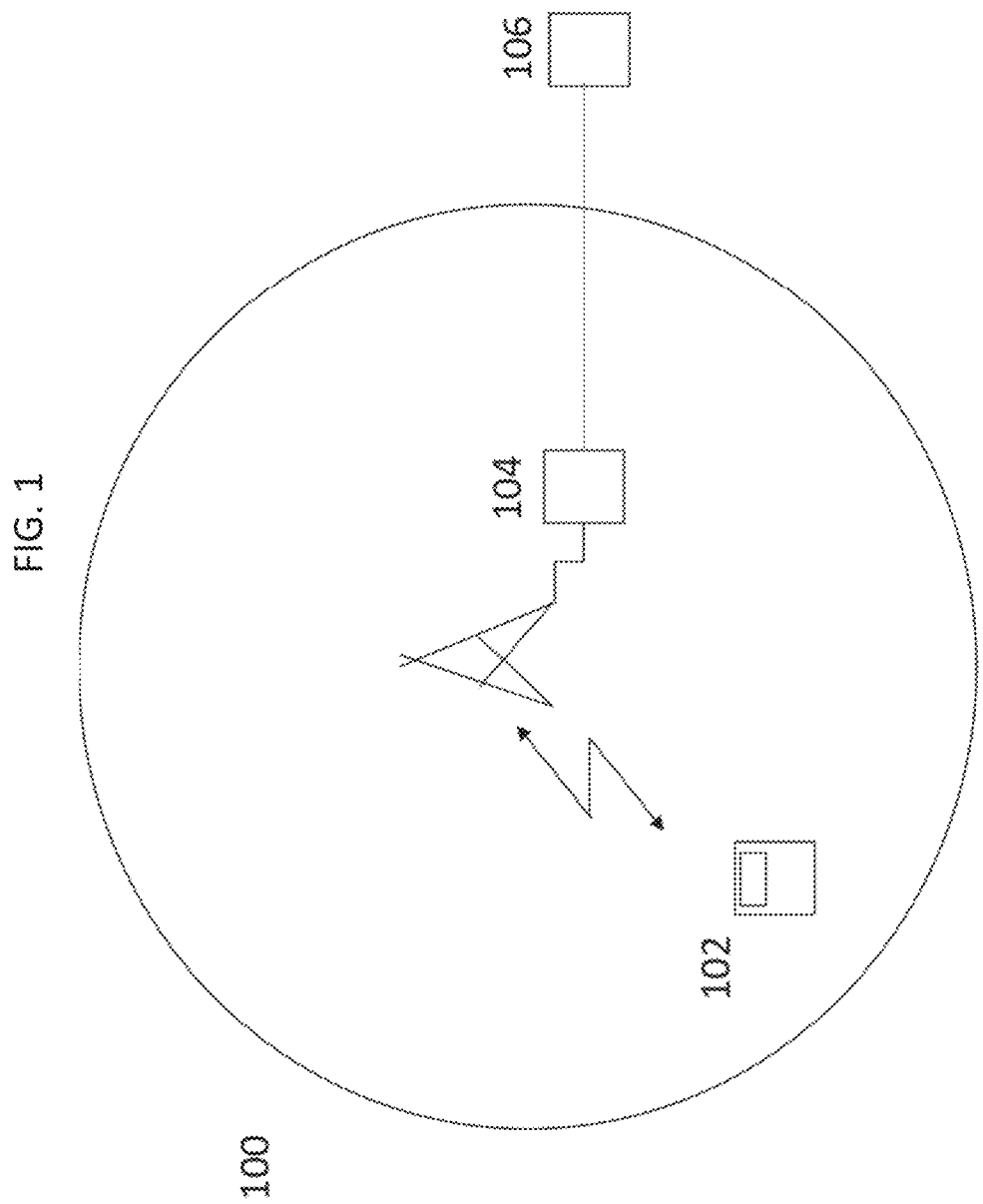
FIG. 1 is a schematic diagram illustrating a wireless network.
Figure 2:
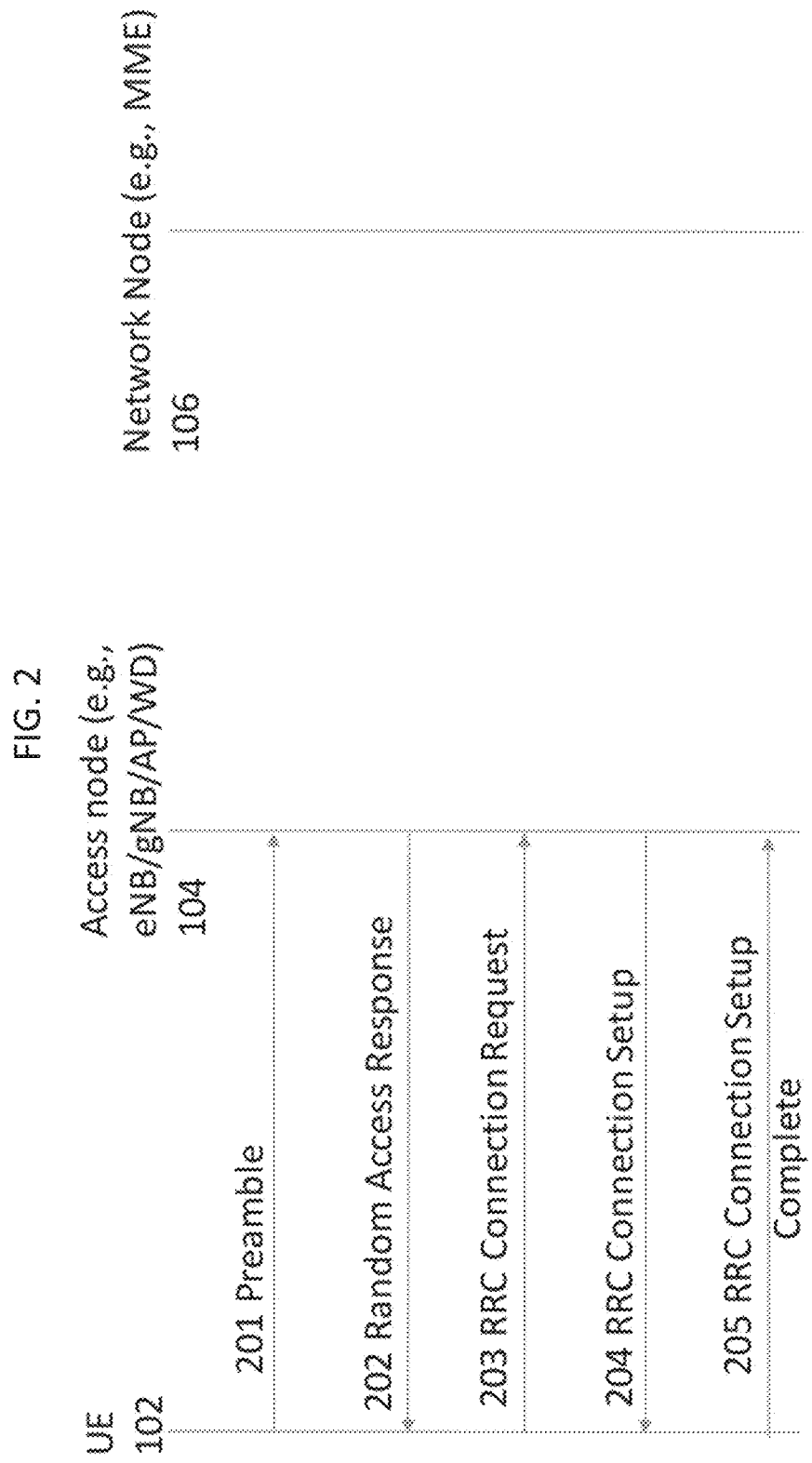
FIG. 2 is a message diagram illustrating random access and RRC connection establishment in 3GPP LTE.

Under certain circumstances, it may be desirable to prevent UEs from requesting the RRC connection, i.e. the whole procedure shown in FIG. 2, For example, it may be desirable to prevent the request in case of a disaster, network maintenance, or an extreme overload situation like extreme radio resource congestion or extreme shortage of processing capabilities. In such circumstances, a network may wish to reduce overload by preventing access attempts to, e.g., a cell. Also, in these cases, the network may need to prioritize between specific users and/or services during overload situations.

To cope with these circumstances and prevent access attempts, the network may employ what is in 3GPP referred to as access control. Access Class Barring (ACB) is an example of one such control. In short, access barring is about preventing or making it less likely that a UE will attempt to send an access request (e.g., to initiate the sequence above by sending a preamble, 201). In this way, the total load in the system can be controlled. The network may for example divide UEs or different reasons for why a UE wants access into different classes, or categories and dependent on this, the network can differentiate and make it less likely that, e.g., certain UE's and/or certain events trigger access requests. For example, a given UE may belong to a certain access class and the network may communicate, via broadcasted system information, that certain classes at certain instances are barred, i.e., not allowed to make access, or allowed to make access with a lower probability if not barred altogether. When a UE receives this broadcasted system information, if it belongs to a barred access class, it may result in that a UE will not send an access request. There are multiple variants of access barring mechanisms specified for LTE, a few of which are listed below:

1. Access Class Barring as per 3GPP Rel-8: In this mechanism, it is possible to bar all access requests from a UE. Normal UEs in Access Class (AC) range 0-9 are barred with a probability factor, also referred to as barring factor and a timer, also referred to as barring duration, whereas specific classes can be controlled separately. Beside the normal classes 0-9, additional classes have been specified to control the access to other type of users, e.g. emergency services, public utilities, security services, etc.
2. Service Specific Access Control (SSAC): The SSAC mechanism allows a network to prohibit Multi-Media Telephony (MMTel)-voice and MMTel-video accesses from a LE. The network broadcasts barring parameters (parameters similar to ACB) and a barring algorithm that is similar to ACB (barring factor and random timer). An actual decision if access is allowed is done in the IP Multi-Media Subsystem (IMS) layer of a UE.
3. Access control for Circuit-Switched FallBack (CSFB): The CSFB mechanism allows a network to prohibit CSFB users. A barring algorithm used in this case is similar to ACB.
4. Extended Access Barring (EAB): The EAB mechanism allows a network to prohibit low priority UEs. Barring is based on a bitmap in which each access class (AC 0-9) can he either barred or allowed.
5. Access class barring bypass: The ACB mechanism allows omitting access class barring for IMS voice and video users.
6. Application specific Congestion control for Data Communication (ACDC) barring: ACDC allows barring of traffic from/to certain application. In this solution, applications are categorized based on global application identification (ID) (in Android or iOS). The network broadcasts barring parameters (barring factor and timer) for each category.) All the variants of access control operate for UEs in idle mode prior to random access and RRC connection establishment. SSAC additionally can be applied also for connected mode UEs, i.e. UEs in RRC-_CONNECTED state in LTE.

In LTE, before a UE performs access towards an access node, it needs to read certain system information that is usually broadcast by the access node 104. The system information describes how access should be performed to initiate communication between the UE (102) and the access node (104). Part of this system information may be information related to access barring. This barring information is usually broadcasted in the access network 100 and there can be different barring information in different cells or areas. Usually, one access node (104) will transmit its own barring information. The barring information may be arranged in a way such that it includes a set of access categories [1 . . . m] and for each category, information elements containing a barring factor and a barring time, for example as specified in 3GPP TS 36.331 v.14.1.0, 2016-12 (see FIG. 3 below, illustrating an example of ACDC barring information in LTE).

This barring information per access category will be used by the UE attempting access and it is a way for the access node to limit and prioritize certain accesses over other.

Figure 4:
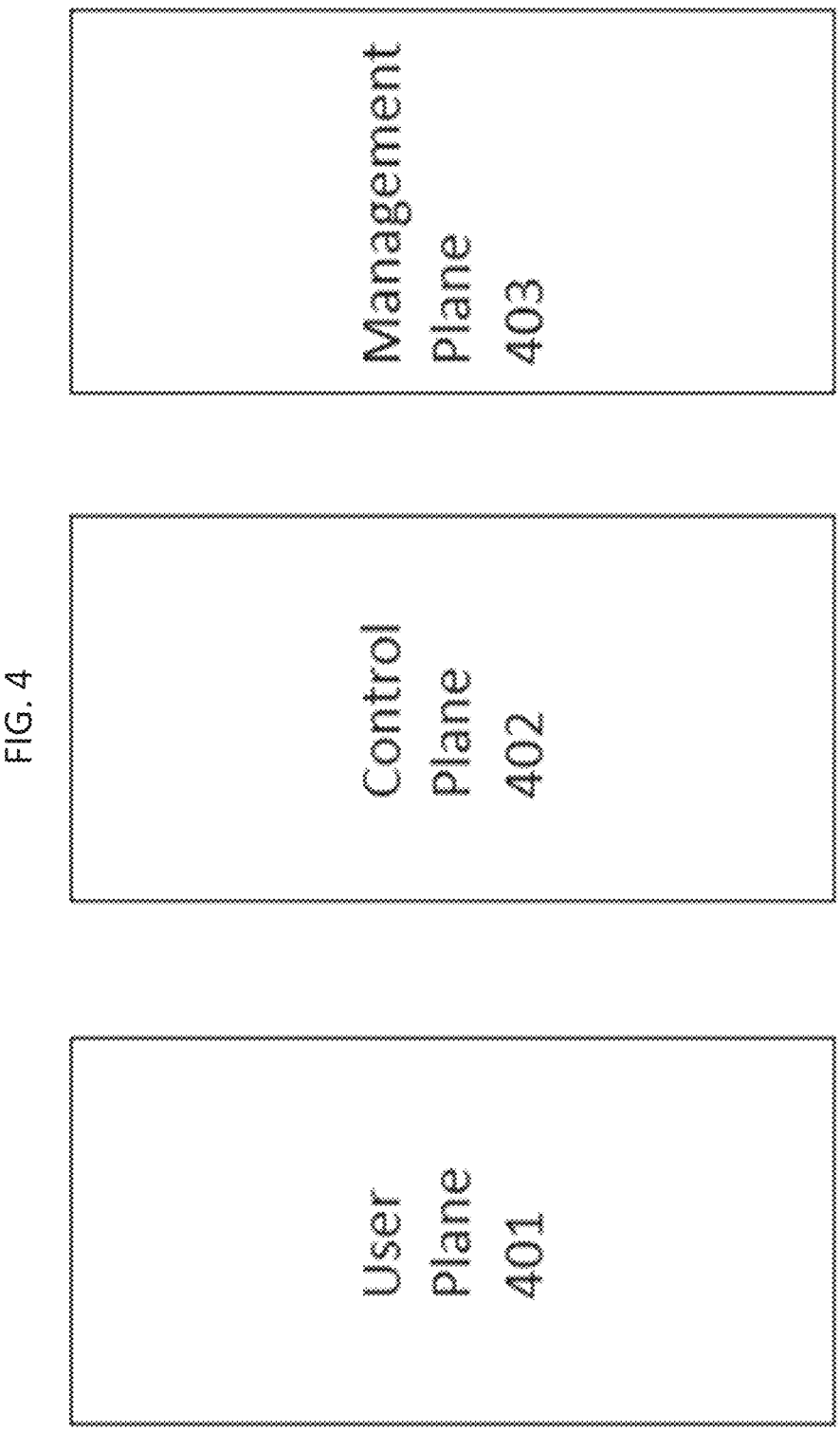
FIG. 4 illustrates planes in a communication system.

3GPP System architectures are discussed below. FIG. 4 illustrates planes in a communication system. A communication system, such as a 3GPP system, is normally functionally divided vertically into User Plane 401, Control Plane 402 and Management Plane 403 as illustrated in FIG. 4, This division allows independent scalability, evolution and flexible deployments. The user plane 401, which carries the user data traffic, contains functions and protocols related to user data transfer such as segmentation, reassembly, retransmission, multiplexing, ciphering and so forth. In the control plane 402, which carries signalling traffic, we find the protocols and functions needed to setup, release, control and configure the user plane. The control plane 402 also contains functions and protocols related to for example UE mobility, UE authentication, control of user sessions and bearers (also known as service data flows or QoS flows). In the Management plane 403, which carries administrative traffic, we find for example operations and maintenance (O&M) and provisioning functions. There exists normally no distinct division between control plane 402 and management plane 403 but typically the control plane 402 operates in a faster time scale (e.g. seconds) than the management plane 403 (e.g. hours). Then the User Plane 401 operates typically in the fastest time scale (e.g. milliseconds).

Figure 5:
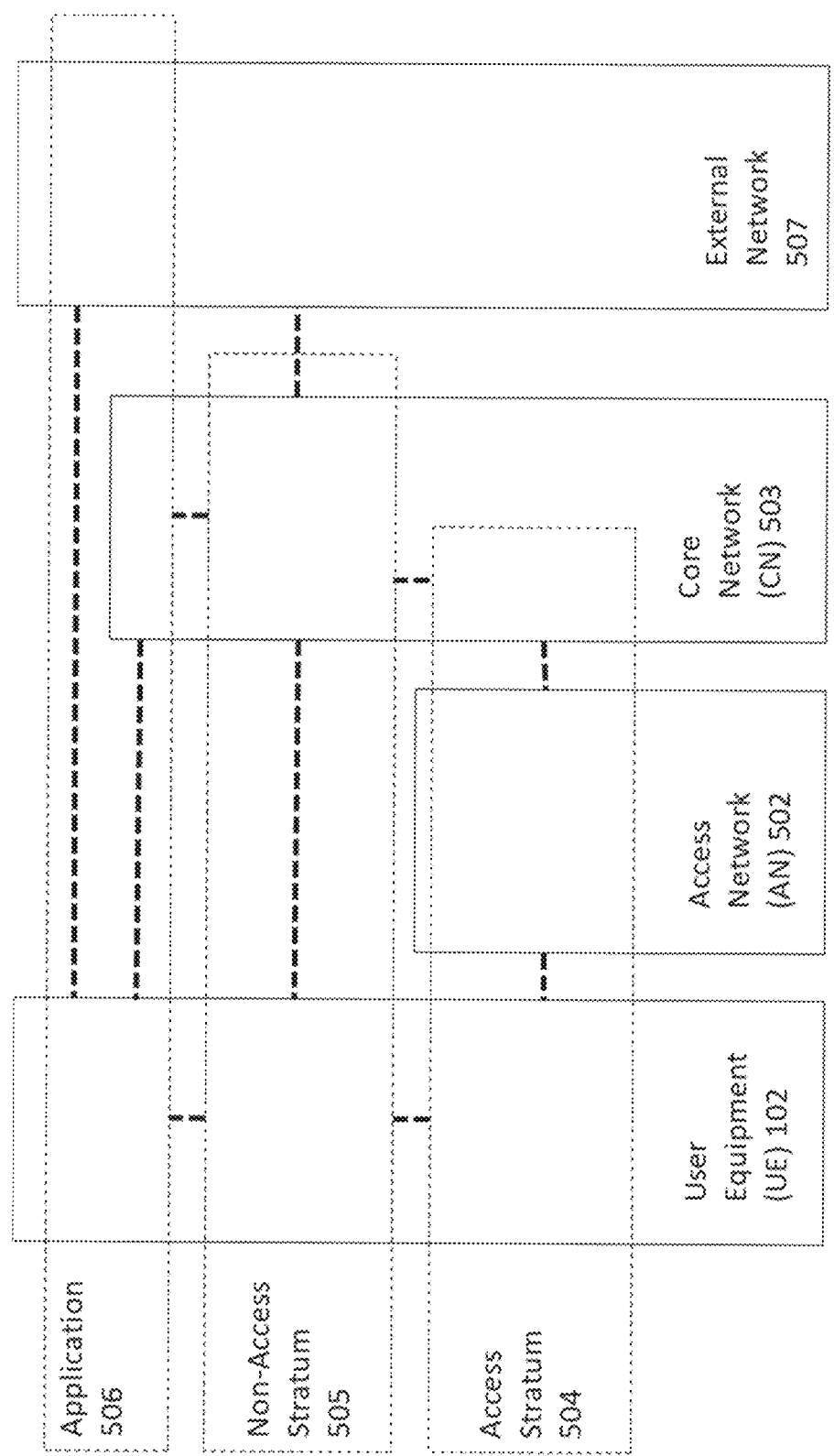
FIG. 5 illustrates domains and strata in a 3GPP system.

FIG. 5 illustrates another division of the 3GPP system, into domains and strata. There are a number of domains, most important are the User Equipment (UE) 102, the Access Network (AN) 502 and the Core Network (CN) 503. It needs to be understood that typically the UE 102, AN 502, and CN 503 all contain User Plane 401, Control Plane 402 and Management Plane 403 functions.

The User Equipment (UE) 102 is a device allowing a user access to network services. It is typically a wireless terminal, such as a smartphone, equipped with a User Services Identity Module (USIM). The latter contains the credentials in order to unambiguously and securely identify itself. The functions of the USIM may be embedded in a standalone smart card, but could also be realized, e.g., as software in a software module.

The Access Network (AN) 502 (also known as the Radio Access Network, RAN) contains access nodes, or base stations, also known as eNBs, gNBs, which manage the radio resources of the access network and provides the UE 102 with a mechanism to access the core network 503. The Access Network 502 is dependent of the radio access technology used in the wireless interface between the UE 102 and Access Network 502. Thus, we have different flavours of access network 502 for different radio access technologies, such as E-UTRAN supporting LTE or E-UTRA radio access technology and NG-RAN supporting New Radio 5G) type of radio access technology The Core Network (CN) 503 consists of network nodes which provide support for the network features and telecommunication services, such as the management of user location information, control of network features and services, the switching and transmission of signalling and user data. The core network 503 also provides the interface towards the External Network 507. There are different types of core networks 503, for different 3GPP system generations. For example, in 4G, also known as the Evolved Packet System (EPS), we find the Evolved Packet Core (EPC). Developed as part of the 5G System (5GS) we find the 5G Core (5GC).

Moreover, the core network 503 is access-agnostic and the interface between the access network 502. and core network 503 enables integration of different 3GPP and non-3GPP access types. For example, an Access Network 502 (also known as E-UTRAN) supporting LTE or E-UTRA radio access technology as well as an access network (also known as NG-RAN) supporting New Radio type of radio access technology can both be connected to a 5G type of core network 503 (also known as SGC).

The External Network 507 represents here a network outside of the 3GPP domain, such as the public Internet.

As seen in FIG. 5, 3GPP system is also horizontally divided into the access Stratum (AS) 504 and Non-Access Stratum (NAS) 505 reflecting a protocol layering hierarchy. In the AS 504 we find functions which are related to the wireless portion of the system such as transport of data over the wireless connection and managing radio resources. The AS 504 typically contains functions in the access network 502 and the dialogue (using corresponding protocols) between the UE 102 and the access network 502. In the NAS 505, which can be seen as higher in the protocol layering hierarchy than AS 504, we find the functions which are not directly dependent on the radio access technology and typically the functions in the core network and the dialogue (using corresponding protocols) between the UE 102 and the core network 503.

In FIG. 5, also the Application 506 is illustrated above NAS 505. The Application 506 may contain parts in the UE 102, the core network 503 and the External network 507.

Figure 6:
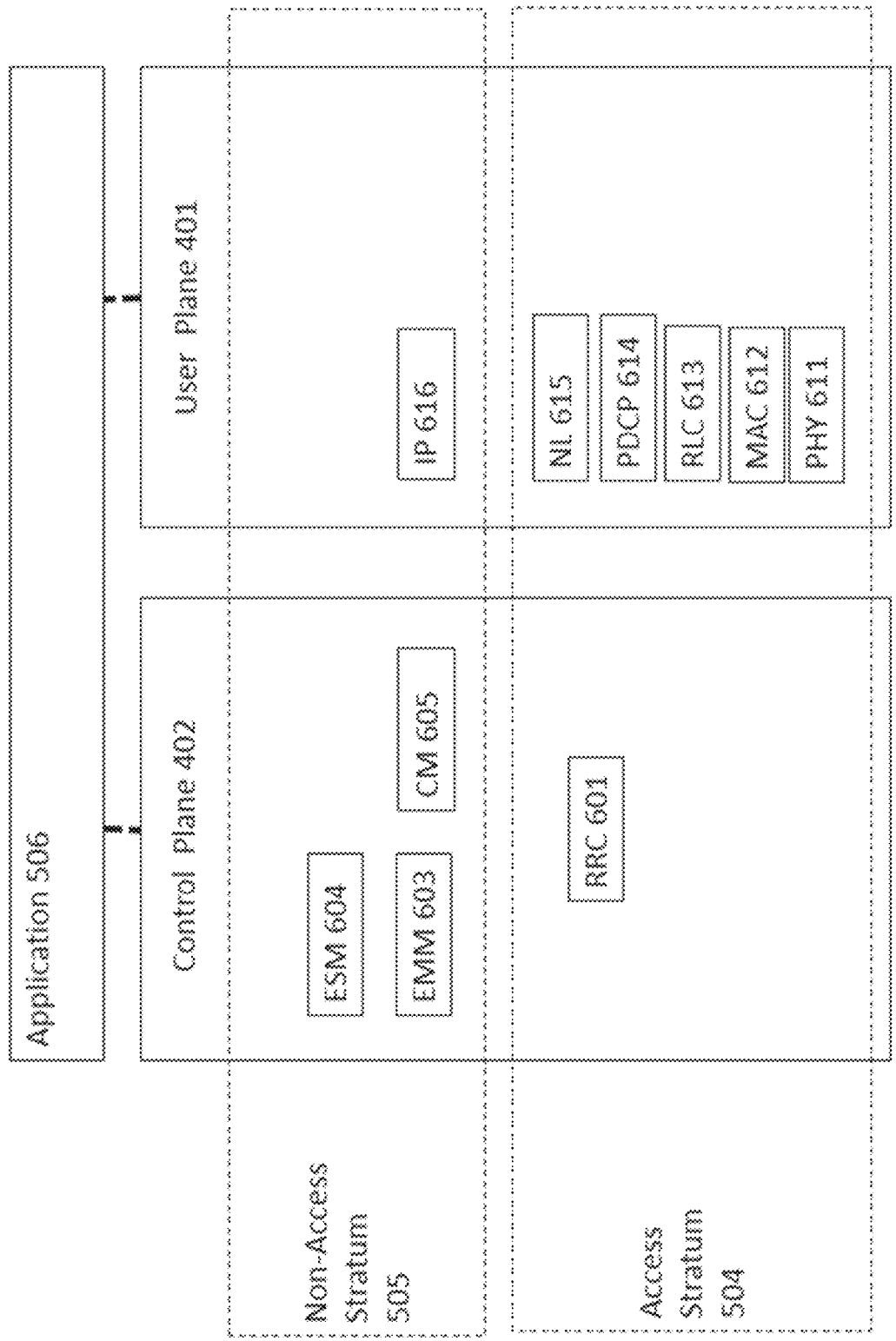
FIG. 6 illustrates protocol layers in user plane and control plane of a 3GPP system.

FIG. 6 illustrates protocol layers in user plane and control plane of a 3GPP system. The control plane 402 and User Plane 401 of the Access Stratum 504 and Non-Access Stratum 505 are further divided into protocol layers. As illustrated in FIG. 6, in the Access Stratum (AS) 504, there is one protocol layer in the control plane 402, namely the Radio Resource Control (RRC) layer 601. As the RRC layer 601 is part of the Access Stratum 504, it is dependent on the type of radio access technology used between the UE 102 and Access Network 502. Thus, there are different flavours of RRC 601 for different radio access technologies, e.g. one type of RRC layer 601 for each of UTRA, E-UTRA and New Radio type of radio access technologies.

Further, in the Access Stratum 504 there are also a number of protocol layers in the user plane 401, such as the Physical (PHY) layer 611, Medium Access Control (MAC) layer 612, Radio Link Control (RLC) layer 613 and Packet Data Convergence Control (PDCP) layer 614. For New Radio, we also expect a new layer in the AS 504, above PDCP 614, here denoted "NL" (New Layer) 615. All protocol layers, both in the User Plane 401 and Control Plane 402 of the Access Stratum 504 are terminated in the Access Network 502 in the network side, such as the eNB or the gNB.

In the Non-Access Stratum (NAS) 505, there are multiple protocol layers in the control plane 402. In EPS (Evolved Packet System, also known as 4G or LTE) these layers are known as EMM (EPS Mobility Management) 603 and ESM (EPS Session Management) 604. In the 5G system, we will find protocol layers performing the equivalent functions of EMM 603 and ESM 604, such as the Connection Management (CM) 605.

Further, in the Non-Access Stratum (NAS) 505, there are multiple protocol layers in the user plane 401, such as the Internet Protocol (IP) 616.

The Application 506 resides above the NAS 505, and interacts with the user plane 401 and in some cases also the control plane 402.

Unified Access Control in 3GPP is discussed below.

An ongoing evolution of the access control mechanisms, in particular for 5th generation cellular standards according to 3GPP, is to gather the existing access control mechanisms into one single mechanism that can be configurable and adaptable to various network operator preferences. It has thus been agreed that 5G will include a single access control framework, what is known as Unified access control.

Unified access control will apply to UEs accessing 5G Core via NR (New Radio) or E-UTRA/LTE. Moreover, Unified access control is applied in all UE states, whereas for LTE, with one exception (SSAC), the access control mechanisms only apply for idle mode UEs.

Unified access control for 5G is currently being specified in 3GPP TS 22.261 (5G service requirements), 3GPP TR 24.890 (5G system core network CT1 aspects), 3GPP IS 38.300 (RAN stage 2) and 3GPP IS 38.331 (RRC protocol specification).

According to the solutions being discussed in 3GPP, the access node (e.g. gNB or eNB) indicates barring condition for each cell using access barring parameters to UEs, by system information broadcast in the RRC layer within the access stratum (AS).

Further, in the UE, there is a process which detects what is known as "access attempts". An example of an access attempt is a request to setup a new session, such as a new PDU session or an MMTEL Voice call. Each detected access attempt is mapped onto an access category.

In TS 22.261, the access categories are specified in FIG. 7 which illustrates access categories for 5G Unified Access Control.

3GPP TS 22.261 also specifies what is defined as "Access Identities". A UE is configured with one or multiple access identities in order to reflect if the UE is a "normal UE" or configured for use by special, typically high-priority services. An example of the UE is for operator use or for mission-critical services. In the table of FIG. 8, the access identities specified in TS 22.261 for 5G Unified Access Control are illustrated.

The stage-1 requirements in TS 22.261 do not define in detail what an "access attempt" is. Definition of the access attempts, for each access category, is now being done by 3GPP working groups (mainly CT1 and RAN2). It is understood that access attempts may be detected and identified in several layers in the UE, including 5GSM, 5GMM, SMSoIP, MMTEL and RRC. But "double barring" should be avoided and therefore a given access attempt should only be detected at one place in the protocol stack, and only once.

Typically, the layer which detects the access attempt performs the mapping to access category, triggers an access barring check, and performs enforcement of blocking the attempt if not authorized.

Figure 9:
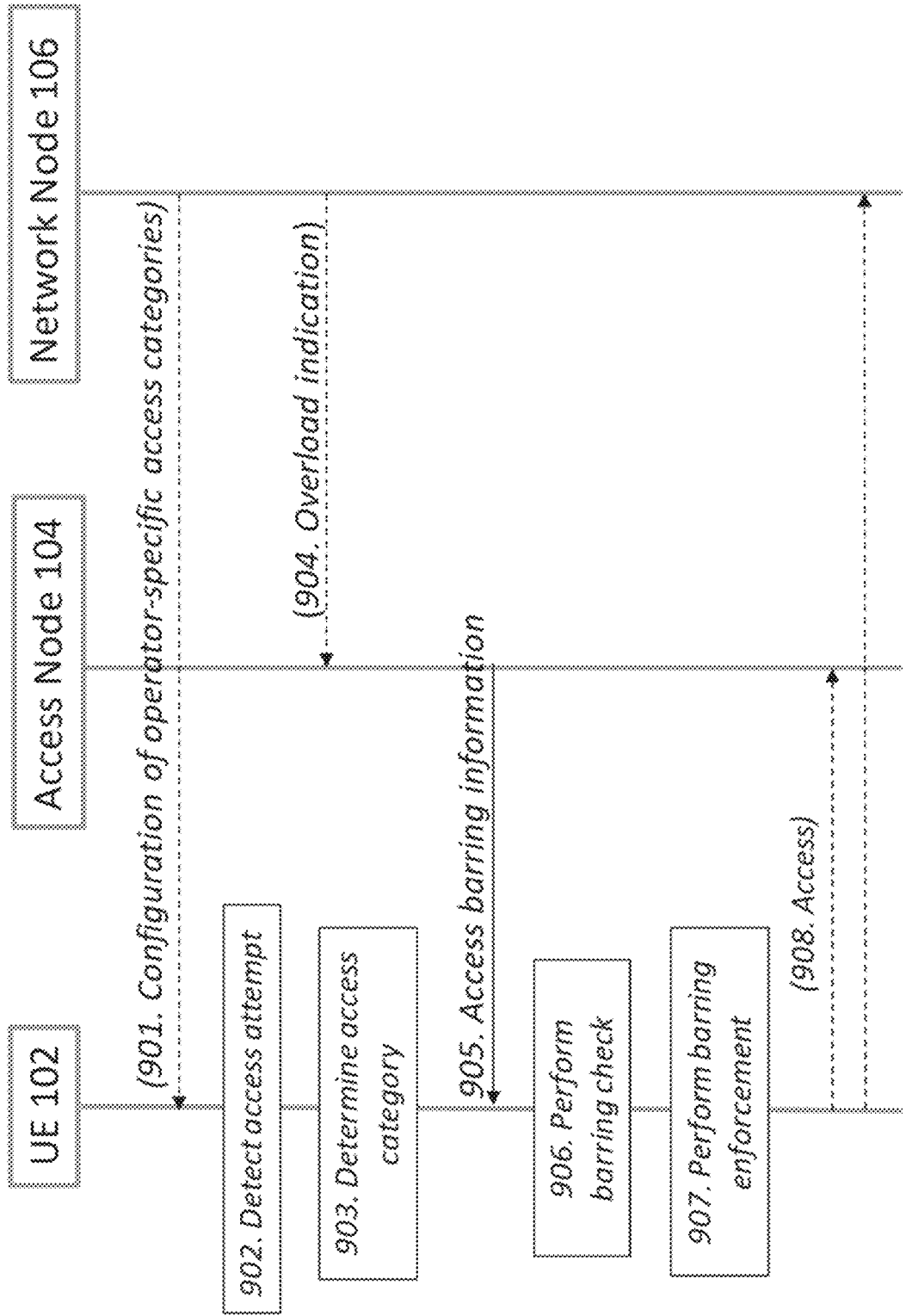
FIG. 9 is a message diagram illustrating procedures for unified access control.

An overall procedure for unified access control is described below with respect to FIG. 9.

Before an access is attempted by a UE (102), it needs to associate an event, such as, for example, a trigger from higher layers in the UE to send a signalling message, to an access category of the [1 . . . m] access categories.

To do this, the UE may be provided with instructions or rules from the network. FIG. 9 illustrates a signalling diagram for one exemplary procedure.

In a first step 901, a network node optionally provides rules for the operator-specific access categories. In FIG. 9, this information is illustrated as originating from the network node (106) but may very well also originate from other network nodes and be transmitted to the UE via network node (106) or possibly via another node (e.g. an operator's policy functionality configuring the UE (102) via WLAN access network). If the network includes a higher-level controller or policy functionality it may originate from another node hosting such controller or policy functionality. The higher layer rules may be signalled to the UE via Non-Access-Stratum (NAS) signalling from a core network node, such as the AMF (Access and Mobility Management Function), or it may be signalled using other protocols, for example, the UE (102) may include an entity that can be configured with and host access category rules signalled using an Open Mobile Alliance device management (OMA-DM) protocol.

Included in the rules from the network node (106) could be information related to for example, how a UE should select access category if the access attempt relates to one or more of a PDU session with the requested DNN (Data Network Name) set to a particular value, a particular SQI (5G QoS Identifier) value, or with specific values of inside the IP packet header (e.g. destination IP address or destination port number). Rules can also include information related to access to various slices. For example, a small device-UE (102), may want to access, e.g., an IoT-optimized slice.

When an event in the UE occurs, which triggers what is defined as a detected access attempt 902 a need for the UE 102 to request an access to the network, such as a need to establish a new PDU session or to setup an MMTel voice or video call, the UE 102 first determines the access category in step 903, based on the available rules including those which were obtained in step 901, together with standardized rules. After determining the access category for this particular access, the UE 102 then reads access barring indications typically part of the broadcasted system information in step 905. Typically, the UE 102 is required to maintain the latest version of the broadcasted system information which implies that the UE 102 in many cases does not actually have to re-read the system information and instead can use cached system information. It then performs an access barring check in step 906, using the determined access category and the access barring indication as input. In step 907 the UE performs enforcement of any barring, i.e. if the barring check results in that the access was not-authorized/"barred" the UE will not perform an access and instead wait for a period, such as a period indicated in the access barring indication. But in case the barring check results in that the access was authorized/"not barred" the UE 102 can proceed with the access attempt (such as establishing a PDU session or MMTel voice or video call) in step 908. In case the UE was in idle mode or RRC_INACTIVE state, it also needs to establish (or resume in case of RRC_INACTIVE) the RRC connection including a random access as part of step 908.

The development of a unified access control mechanism for access barring is currently ongoing.

Figure 10:
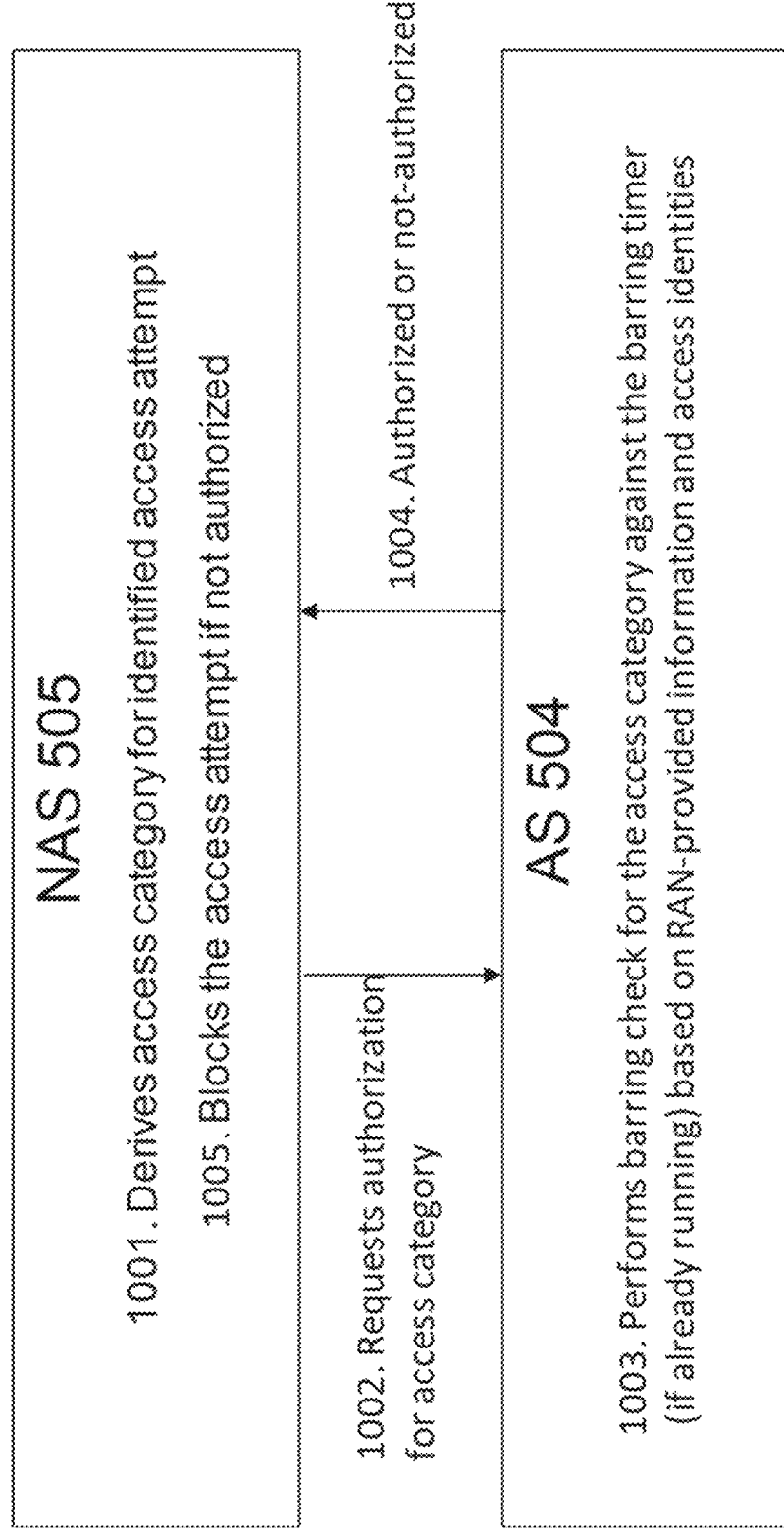
FIG. 10 is a block diagram illustrating NAS-AS interaction in the UE for unified access control.

FIG. 10 illustrates a model in the UE 102 for the interaction between NAS 505 and AS 504 when performing barring check when an access attempt is detected as part of unified access control. It should be noted that the barring check can be performed at any time a new access attempt is detected and in all UE states, including RRC_IDLE, RRC_INACTIVE and RRC_CONNECTED. It should also be understood that at the time NAS requests a signalling connection, all barring checks should already have been performed and passed.

There currently exist certain challenges. In the recent developments of unified access control in 3GPP, it is being discussed to use the access category for the access attempt which triggered the request for RRC connection, as a replacement of the RRC Establishment Cause.

The main challenge when using the access category directly in the RRC Connection Request message, is that the size of the RRC Connection Request message (msg3), is very limited, in order to meet coverage requirements in all scenarios. This typically means that the full size of the Access Category (six bits) may not fit into the message when considering other information elements which are more important, such as the UE identity. In LIE the size of the RRC Establishment Cause is three bits.

As an alternative approach, it has been suggested to use the access category as an input to determine the RRC Establishment Cause, that is, a mapping from the access categories onto RRC Establishment Causes are specified in the standard.

In this alternative approach, the above size limitation can be mitigated somewhat. However, the access category selected by the UE for the access attempt may be one of the operator-defined, also known as operator-specific, access categories. The meaning of a given operator-defined access category value is not standardized and are core network operator-specific and in case of shared networks, multiple core networks share the same RAN and access nodes. These values can therefore typically not be interpreted by RAN.

Yet another aspect to be dealt with is how Access Identities configured in the UE are to be used when determining the RRC Establishment Cause. In UE, a UE configured with any of the access classes AC11-15 will in most cases use the highPriorityAccess value of the RRC Establishment Cause.

Recently in standardization meetings and discussions, the potential need has also been brought up to introduce some degree of flexibility for the network operator to configure the setting of establishment causes, or even have network-specific cause values in order to tailor how the UEs set their establishment cause values. There is no solution yet for how to configure cause values for 5G/NR.

Thus, there is a need for methods and apparatuses to determine the RRC Establishment Cause, which:
use Access Category and Access identities as input,
can meet the size limitations of msg3;
can handle operator-defined access categories; and
provide a possibility for the network to configure the establishment cause values.

Certain aspects of the present disclosure and their embodiments may provide solutions to these or other challenges. Embodiments herein relate to wireless communication systems such as cellular networks. Methods, user equipments, and network nodes for transmitting and receiving messages related to wireless access are disclosed herein.

According to certain embodiments, when the UE is about to request an RRC Connection, it evaluates the ongoing access attempts and determines the most appropriate access attempt (this can be performed in alternative ways, e.g. the one which triggered the request, the most prioritized one, or some other criteria). With this selected most appropriate access attempt, the UE then determines an associated most appropriate access category value.

In many cases, the determination of the most appropriate access category is performed in the same way as determination of the access category for unified access control (i.e. barring check). In case the determined access category for unified access control is a standardized access category, the most appropriate access category is the same as the determined access category for unified access control. In case the determined access category for unified access control is an operator specific access category, the UE will determine the most appropriate access category using one of several approaches, including, but not limited to:

1. The UE will select the most appropriate access category according to rules for selection of the access category for unified access control, but does not consider the operator specific access categorization policy (i.e., only standardized access categories can be selected).
2. As part of the configuration for the operator-defined access category, the UE would have selected to perform access barring check for the most appropriate access attempt, the standardized access category is stored. The UE will then use this stored standardized access category value as the most appropriate access category.

According to certain embodiments, when the UE has determined a most appropriate access category, the UE uses the most appropriate access category, together with the access identities configured in the UE, to select an RRC Establishment Cause. The method to perform this selection is typically standardized in a specification, e.g. as a mapping table.

The UE may then put this selected RRC Establishment cause value into the RRC Connection Establishment message when requesting the RRC Connection.

Figure 11:
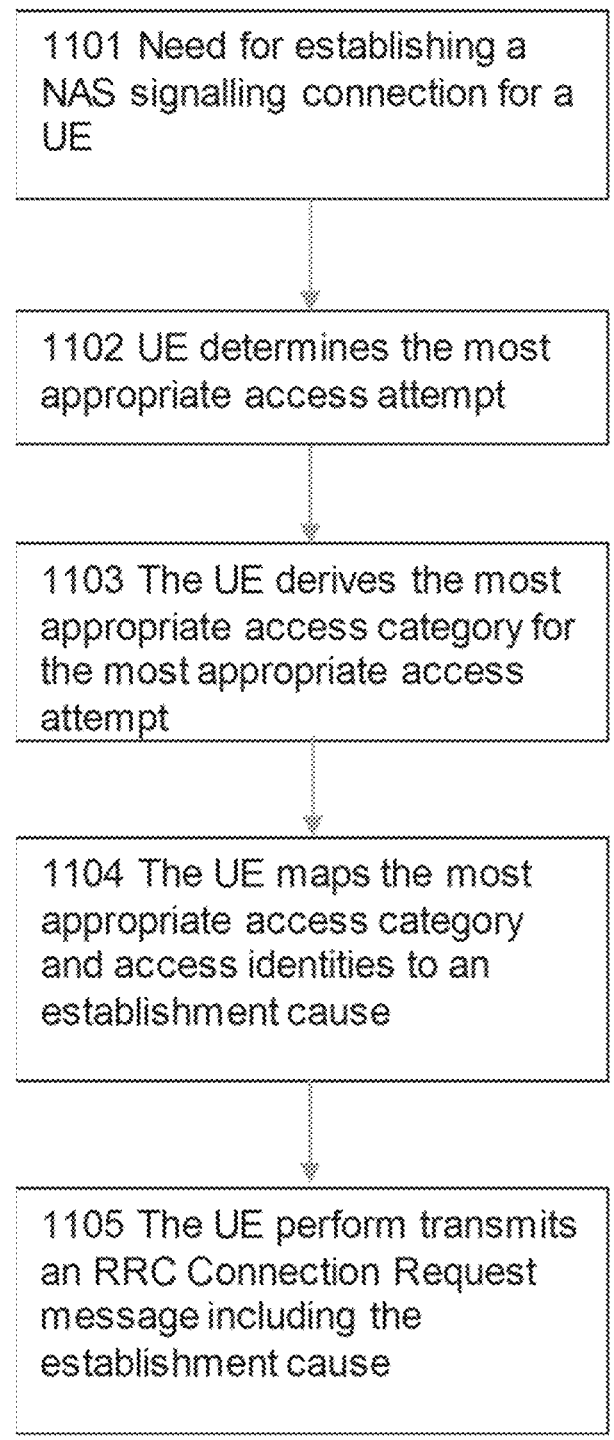
FIG. 11 is a flow diagram illustrating a method of performing a connection request according to sonic embodiments of inventive concepts.

FIG. 11 is a flow diagram showing a method, performed by a UE, according to particular embodiments disclosed herein.

There are, proposed herein, various embodiments which address one or more of the issues disclosed herein. Specifically, UEs, network nodes, and methods performed by said UEs and network nodes are disclosed, as will be described in more detail. Certain embodiments may provide one or more of the following technical advantages. For example, certain embodiments provide solutions to determine the RRC Establishment Cause, which solutions use Access Category and Access Identities as input, meet the size limitations of msg3, can handle operator-defined access categories, and provide a possibility for the network to configure establishment cause value setting by the UEs.

According to certain embodiments, by mapping access categories (in particular operator-specific categories) into a smaller set of establishment cause values, the number of establishment causes that needs to be defined may be reduced, since we don't need one codepoint in the establishment cause value range for each access category value. In this way, the RRC Connection Request message becomes shorter and will more likely meet requirements on range and/or reliability. Furthermore, by defining which establishment cause to use for each individual operator-specific access category, the corresponding connection requests can be prioritized in a better (i.e., more fair) way, and as well reflect the criteria for determining operator-specific access category, such as DNN, 5QI and slice. According to certain embodiments, the solution also provides the flexibility to define operator-specific establishment cause values, which will further differentiate between connection requests. For example, it may be possible to let the priorities between slices be reflected in the establishment cause. It also makes it possible for a network to add new causes or change meaning of existing cause values to reflect changes in supported services and/or the prioritization of services by a network. Other advantages may be readily apparent to one having skill in the art. Certain embodiments may have none, some, or all of the recited advantages.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Procedures used to determine the establishment cause are discussed below.

Figure 12:
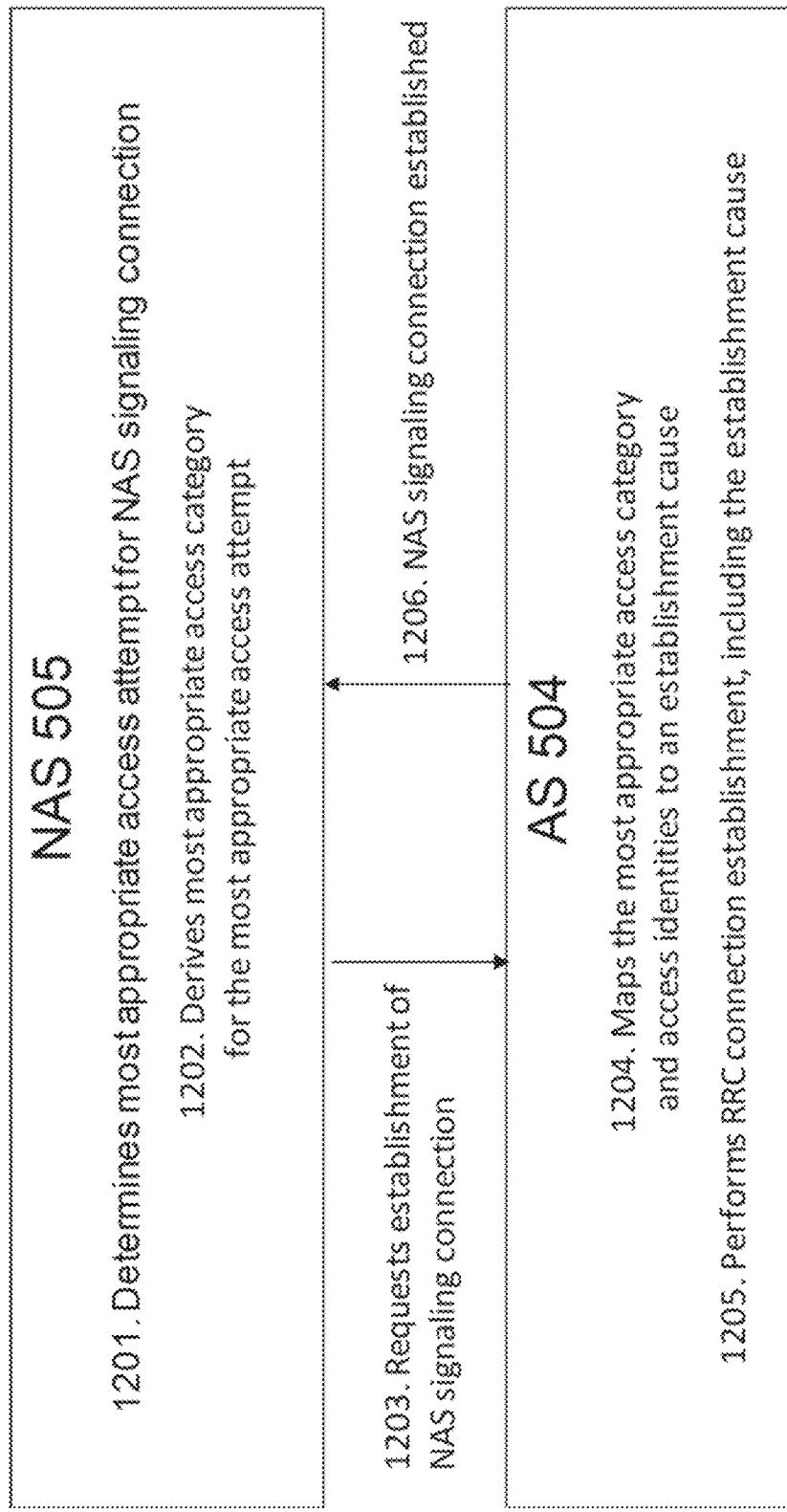
FIG. 12 is a diagram illustrating AS-NAS interaction used to determine an establishment cause according to some embodiments of inventive concepts.

FIG. 12 illustrates certain embodiments of the interaction between the Non-Access Stratum 505 and the Access Stratum 504 in the UE 102 for determining establishment cause when the UE is about to establish a NAS signalling connection.

In step 1201, the NAS 505 detects that a NAS signalling connection is needed according to triggers specified in the NAS signalling protocols, e.g. in the 5GMM protocol layer. The trigger for the need of a NAS signalling connection could, e.g., be that a Registration Procedure is about to start, or a request from upper layers, such as the MMTel layer to establish a voice call. This trigger is in turn identified as an access attempt by NAS 505, and an access category is selected according to the rules for unified access control. In some cases, there may be several access attempts triggered at the same time or a first access attempt is already ongoing when a second access attempt is detected. To cater to those cases of multiple access attempts, the NAS 505 determines one of these multiple access attempts as the most appropriate access attempt according to a rule. In one example, the NAS 505 ranks the multiple access attempts according to their priority—for example, in one priority scheme, emergency calls always have higher priority than all other access attempts and would be determined as the most appropriate access attempt in case an emergency call is ongoing or is about to start. This is just an example, and other priority schemes may also be employed. In another example, NAS 505 selects the most appropriate access attempt as the most recent access attempt, typically the access attempt which triggered the need for a NAS signalling connection. In yet another example, NAS 505 determines the most appropriate access attempt as a random selection of all ongoing and starting access attempts. These are merely a few examples, and other embodiments may be employed to determine which access attempt is deemed the most appropriate.

In step 1202, NAS 505 derives the most appropriate access category for the most appropriate access attempt which was determined in step 1201. This process will be explained in more detail in FIG. 13.

In step 1203, NAS 505 requests AS 504 for a NAS signalling connection, and passes, among other information, the most appropriate access category derived in step 1202, to AS 504. The AS 504, typically the RRC layer 601, is typically in RRC_IDLE state when NAS 505 requests a NAS signalling connection.

In step 1204, the AS 504 then maps the most appropriate access category to an establishment cause value.

In step 1205, AS 504 performs the RRC connection establishment procedure and includes the establishment cause obtained in step 1203 in the message requesting the connection, typically the RRC Connection Request message.

When the RRC connection has been successfully established, the AS 504 confirms the establishment of the NAS signalling connection to NAS 505 in step 1206.

Figure 13:
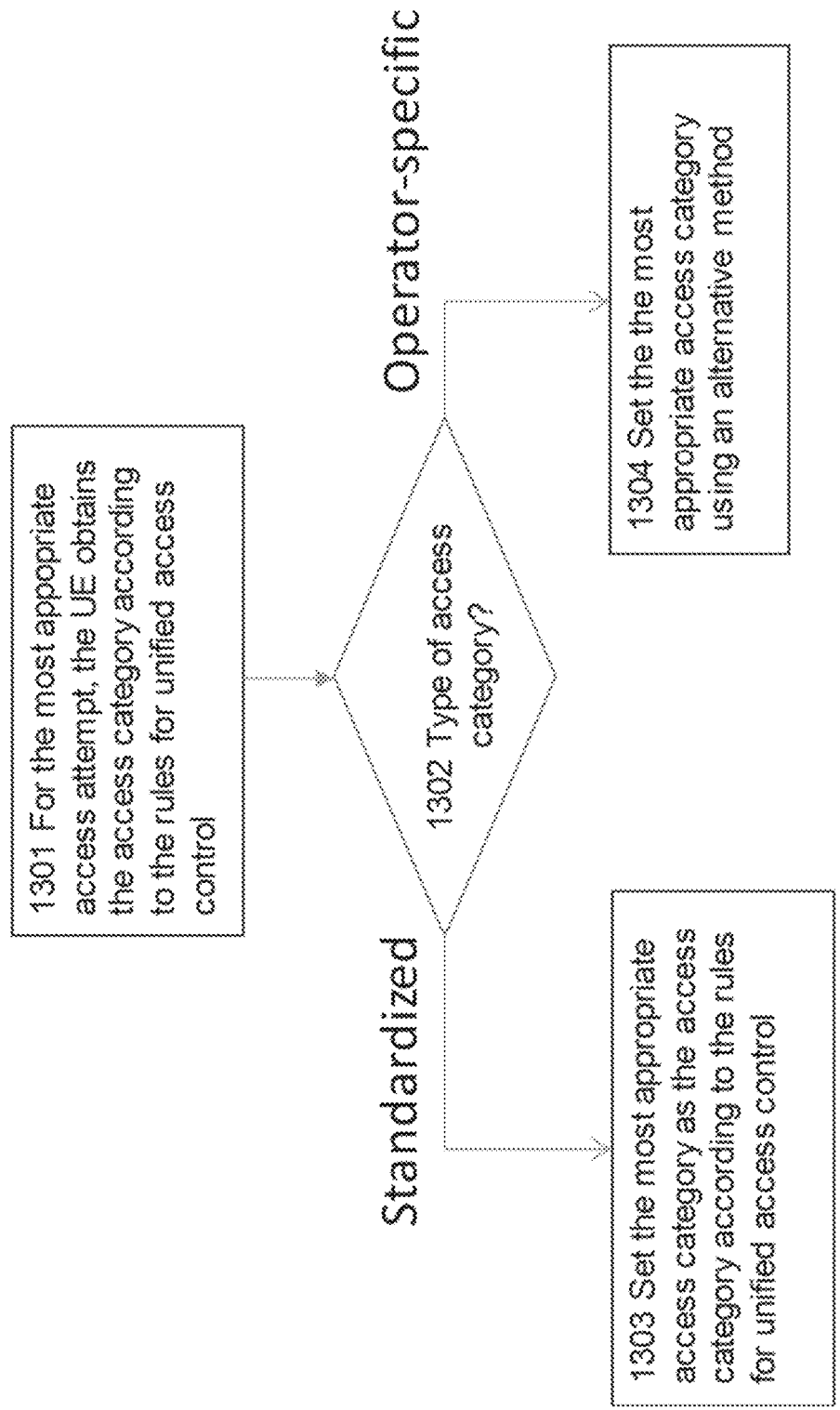
FIG. 13 is a flow chart illustrating operations used to determine an appropriate access category according to some embodiments of inventive concepts.

FIG. 13 illustrates a method for the determination of the most appropriate access category performed in step 1202.

In step 1301, the UE 102, typically NAS 505, uses the rules for unified access control to determine the access category for the most appropriate access attempt determined in step 1201. Since unified access control is performed on all access attempts, this step may have already been performed before the barring check for the access attempt determined as the most appropriate access attempt.

In step 1302, the UE checks the type of the access category obtained in step 1301 (standardized access category or operator-specific access category).

If the access category is a standardized access category, the UE in step 1303 sets the most appropriate access category as the access category according to the rules for unified access control, i.e. this standardized access category:

If the access category is an operator-specific access category, the UE in step 1304 uses one of several multiple alternative methods for determining most appropriate access category:

In one method, the UE will select the most appropriate access category according to rules for selection of the access category for unified access control but does not consider the operator specific access categorization policy (i.e. only standardized access categories can be selected).

In another method, the UE uses a table which may have been received from the network, typically using NAS signalling from a core network node, such as the AMF (Access and Mobility Management Function), when the operator-specific access categories were configured. The UE looks up the table entry for the access category, obtained in step 1301, and reads the standardized access category stored in this table entry. The UE will then use this stored standardized access category value as the most appropriate access category. This table could be the same table as used for representing the rules for the determination of operator-specific access categories (as illustrated in FIG. 16) or a separate table.

FIG. 14 illustrates an example procedure for the mapping of the most appropriate access category to establishment cause.

In step 1401, the UE (e.g. AS 504) first obtains the access identities configured in the UE. The access identities may be read from the USIM or UICC, or obtained using some rules, e.g. stated in a specification. For example, 3GPP TS 22.261 states that the UE is configured with access identity 11 when the UICC is assigned with the special access class AC11. As the result of this step, the output is one or several access identities.

In step 1402, the UE checks whether an access identity, with the value 0 is available. Typically, the access identity with value 0 is used when the UE does not have any other access identities. In this case it is a "normal UE", such as a UE without any high-priority services or without any high-priority subscriber.

If the access identity is 0, the UE proceeds in step 1403 by determining the establishment cause solely by using the value of the most appropriate access category and uses this establishment cause in the RRC connection request message.

If there are one or several access identities with a value other than 0, the UE proceeds in step 1404 by using at least the access identity to determine the establishment cause. In one example, the UE sets the establishment cause in this case to always be "High Priority Access" and uses this establishment cause in the RRC connection request message. In another example, access identities other than 0 are mapped on two different establishment causes, so that access identities 1-7 are mapped onto establishment cause High Priority Access-1 and access identities 8-15 are mapped onto High Priority Access-2. When the establishment cause High Priority Access, High Priority Access-1 or High Priority Access-2 is included in the RRC connection request message, it indicates to the network that this request should typically not be rejected and should be prioritized in front of accesses with other establishment causes.

In yet another example, the UE sets the establishment cause by using the value of the most appropriate access category, but also includes an additional information element, e.g. to indicate a high priority access, in the RRC connection request message. In yet another example, the UE uses all access identities (e.g. represented as a bit string) along with an establishment cause in the RRC connection request message. Or in yet another example, different values of access identities are mapped onto different establishment cause values, such as access identities 1-7 are mapped onto High Priority-1 and access identities 8-15 are mapped onto High Priority-2. It should be noted that the examples with an additional information element, to indicate high priority and/or access identities, can be used when there is available space in the RRC connection request message.

In yet another example, instead of only using the access identities, when set to a number other than 0, to determine the establishment cause, the combination of most appropriate access category and access identities is used. For example, if the appropriate access category indicates "emergency" (e.g. value 2), and the access identity of value 1 is configured in the UE, the establishment cause value "High Priority Emergency" is used.

FIG. 15 illustrates an example for how to map the most appropriate access category value to an establishment cause, also known as RRC establishment cause. It should be understood that the unified access control for 5G will be applied both for NR and LTE access to the 5G core network. NR and LTE are two different radio access technologies with also different RRC protocols, specified separately. Therefore, the RRC establishment procedures are not exactly the same, and for example the RRC connection request messages are not necessarily of the same format. More specifically, the establishment cause for NR and LTE flavours of RRC will evolve separately. Since the set of values for those two types of establishment causes will most likely be different, the mapping from most appropriate access category for NR will be different than for LTE.

It should be understood that the mapping here is just an example, and it does not preclude that other establishment cause values are defined for NR and LTE. It should also be understood that the same type of mapping may also be performed to the establishment cause used in NB-IoT (Narrowband Internet of Things) variant of UE, or any other radio access technology. For the values 8-31 of access category, which currently are being reserved for future use, if one of them becomes defined, a corresponding mapping from the most appropriate access category value to the RRC establishment cause in NR and LTE needs also to be defined. For example, to map the new appropriate access category value to an existing establishment cause value in NR and/or LTE, such as MO Data. Or, alternatively, to define a new establishment cause value in NR and/or LTE and map the new appropriate access category value to this new establishment cause value.

FIG. 15 is a table illustrating an example of a mapping of a most appropriate access category values to respective establishment cause values according to some embodiments of inventive concepts. FIG. 16 is a table illustrating a table in a UE that is used to configure most appropriate access categories according to operator-specific access category rules according to some embodiments of inventive concepts.

Network configuration of establishment cause values is discussed below. According to alternative embodiments, for the "most appropriate access attempts" with operator-specific access categories, instead of determining a most appropriate access category and mapping it to establishment cause, as performed in FIGS. 13-15, there is an alternative solution.

In one example, as part of the configuration of the operator-specific access categories in the UE, the value of the establishment cause is stored. In other words, when performing an RRC connection establishment triggered by a most appropriate access attempt with this particular access category this particular establishment cause is used by the UE. This is illustrated in FIG. 17. For example, FIG. 17 illustrates in the first row that the operator-specific access category 32 would be used in unified access control, for an access attempt relating to a PDU session with the DNN=18. In addition, when this particular access attempt is selected as the most appropriate access attempt triggering an RRC connection establishment, the establishment cause in the RRC connection request message is set to the value "MO Data".

In another example, a similar method can be used to configure operator-specific establishment cause values, see FIG. 18. For example, FIG. 18 illustrates in the first row that the operator-specific access category 32 would be used in unified access control, for an access attempt relating to a PDU session with the DNN=18. In addition, when this particular access attempt is selected as the most appropriate access attempt triggering an RRC connection establishment, the establishment cause in the RRC connection request message is set to the value "Operator-specifics#8". And for example, as configured in the second row of FIG. 18, an access attempt using slice 5 will use operator-specific access category 33 and be mapped onto establishment cause Operator-specific#8. And, as configured in the third row in FIG. 18, an access attempt using slice 8 (and TCP destination port 8820) will use operator-specific access category 38 and be mapped onto establishment cause Operator-specific#9. In this example access uses e.g. different slices can be mapped on different establishment causes (Operator-specific#8 and Operator-specific#9 in this example) and get different handling and/or prioritization when the network receives the RRC connection request message.

It should be understood that this alternative solution used for determining establishment cause for the operator-specific access categories, can be combined with the solution illustrated by FIG. 13-FIG. 15.

For example, if access identities with value other than 0 are configured in the UE, the UE will use establishment cause based on the access identity, even if the UE has been configured with establishment causes for operator-specific access categories as shown in FIGS. 17-18.

And for example, in case the most appropriate access category is one of the standardized access categories, the UE can use the mapping to establishment cause illustrated in FIG. 15, also when this alternative solution is used for the most appropriate access category being one of the operator-specific access categories.

Embodiments described here are illustrated for the case when including an establishment cause in a message requesting an RRC connection, i.e. the RRC Connection Request message. A person skilled in the art will appreciate that this solution may also be used to determine a cause value also for the request to resume and/or activate the RRC connection (e.g. RRC Resume Request) when the UE is in RRC_INACTIVE state. Unified access control is typically applied for this case and therefore a most appropriate access attempt can be determined also for this case and similar cases when unified access control is applied for an access attempt triggering transmission of a message from the UE.

The model for AS-NAS interaction described here is only an example. For example, it should be understood that this solution can be applied on other models, such as when the AS and/or RRC layer determines most appropriate access attempt and if applicable, most appropriate access category. It should also be understood that this solution can also be applied both in case AS or NAS determines the establishment cause.

Operations of a user equipment UE (also referred to as a wireless device) will now be discussed with reference to the flow chart of FIG. 28, For example, the UE may be implemented using the structure of FIG. 19 with modules stored in device readable medium 1930 (also referred to as memory) so that the modules provide instructions so that when the instructions of a module are executed by processing circuitry 1920 (also referred to as a processor), processing circuitry 1920 performs respective operations. Processing circuitry of the UE may thus transmit and/or receive communications to/from one or more network nodes 1960 of a wireless communication network through radio interface 1914.

At block 2801, processing circuitry 1920 may receive an operator defined access category from the wireless communication network through radio interface 1914. At block 2803, processing circuitry 1920 may detect an access attempt, for example, based on at least one of establishing a new protocol data unit PDU session, setting up a voice call, and setting up a video call.

At block 2805, processing circuitry 1920 may determine an access category from a plurality of access categories and at least one access identity from a plurality of access identities to be applied for an access attempt. The access category may be determined based on detecting the access attempt.

At block 2807, processing circuitry 1920 may determine an establishment cause for the access attempt based on the access category determined from the plurality of access categories and based on the at least one access identity from the plurality of access identities.

At block 2809, processing circuitry 1920 may perform an access barring check for the access attempt based on the access category determined from the plurality of access categories and based on the at least one access identity from the plurality of access identities.

Responsive to the access barring check authorizing the access attempt, processing circuitry 1920 may proceed with the access attempt. For example, processing circuitry 1920 may proceed with the access attempt by transmitting a random access preamble for the access attempt through radio interface 1914 to the wireless communication network responsive to the access barring check authorizing the access attempt at block 2811, and by receiving (through radio interface 1914) a random access response for the access attempt after transmitting the random access preamble at block 2813.

At block 2815, processing circuitry 1920 may transmit a connection request message for the access attempt through radio interface 1914 to a wireless communication network responsive to receiving the random access response. Moreover, the connection request message may include the establishment cause determined based on the access category and based on the at least one access identity.

The establishment cause may include one of a plurality of establishment causes including mobile terminated access, emergency call, mobile originated signalling, mobile originated voice call, mobile originated data, and high priority access. Moreover, the establishment cause may be determined based on the access category and based on the at least one access identity as being one of a mobile terminated access, an emergency call, mobile originated signalling, mobile originated voice call, and/or mobile originated data based on mapping the access category determined from the plurality of access categories to the establishment cause. The establishment cause may be determined based on mapping the access category determined from the plurality of access categories to the establishment cause and based on the at least one access identity for the UE being zero.

The plurality of access categories may include an operator defined access category, and the operator defined access category is based on at least one of a data network name and a slice identifier.

Determining the access category and the at least one access identity at block 2805 may include determining that the operator defined access category is to be applied for the access attempt, and the establishment cause may be determined based on mapping the operator defined access category to the establishment cause. For example, the operator defined access category may be based on at least one of a data network name and a slice identifier, and mapping the operator defined access category may include mapping the operator defined access category to the establishment cause for mobile originated data.

According to some embodiments, the establishment cause may be determined as being high priority access based on the at least one access identity for the UE being non-zero.

According to some embodiments, the connection request message of block 2815 may be a Radio Resource Control RRC connection request message, and the establishment cause may be an RRC establishment cause. According to some other embodiments, the connection request message may be a Radio Resource Control RRC resume request message, and wherein the establishment cause is an RRC resume cause.

Various operations of FIG. 28 may be optional with respect to some embodiments of inventive concepts. For example, operations 2801, 2803, 2809, 2811, and 2813 of FIG. 28 may be optional with respect to some embodiments disclosed herein.

Figure 19:
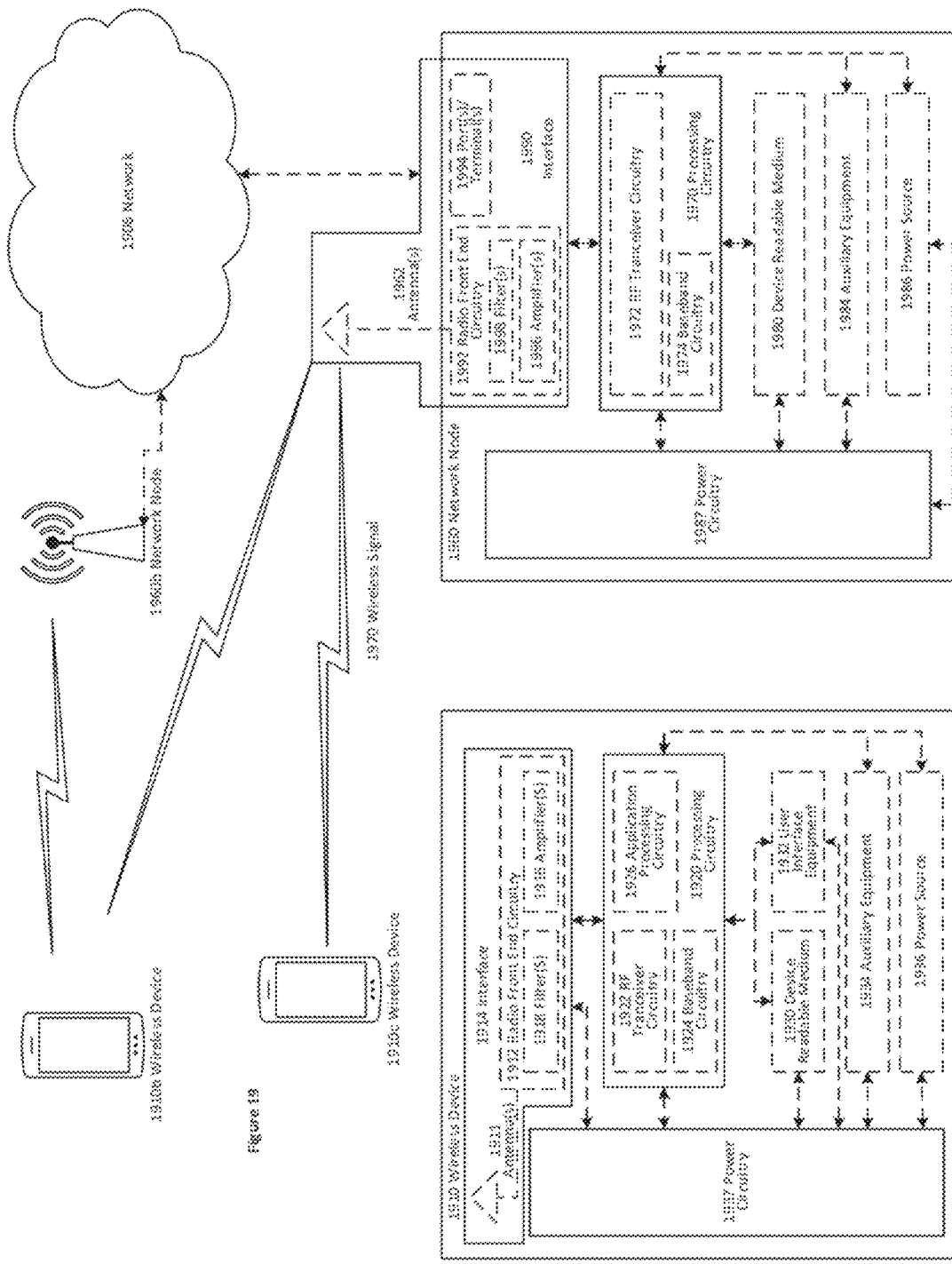
FIG. 19 is a block diagram illustrating a wireless network including wireless devices (also referred to as UEs) and according to some embodiments of inventive concepts.

FIG. 19 is a block diagram illustrating a wireless network according to some embodiments of inventive concepts. Although the subject matter described herein may be implemented in any appropriate type of system using any suitable components, the embodiments disclosed herein are described in relation to a wireless network, such as the example wireless network illustrated in FIG. 19, For simplicity, the wireless network of FIG. 19 only depicts network 1906, network nodes 1960 and 1960b, and WDs 1910, 1910b, and 1910c. In practice, a wireless network may further include any additional elements suitable to support communication between wireless devices or between a wireless device and another communication device, such as a landline telephone, a service provider, or any other network node or end device. Of the illustrated components, network node 1960 and wireless device (WD) 1910 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system.

In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards: and/or any other appropriate wireless communication standard, such as the Worldwide interoperability for Microwave Access (WiMax), Bluetooth, Z-Wave and/or ZigBee standards.

Network 1906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1960 and WD 1910 comprise various components described in more detail below. These components work together in order to provide network node and/or wireless device functionality, such as providing wireless connections in a wireless network, in different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, and evolved Node Bs (eNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 19, network node 1960 includes processing circuitry 1970, device readable medium 1980, interface 1990, auxiliary equipment 1984, power source 1986, power circuitry 1987, and antenna 1962. Although network node 1960 illustrated in the example wireless network of FIG. 19 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1960 are depicted as single boxes located within a larger box, or nested within multiple boxes, in practice, a network node may comprise multiple different physical components that make up a single illustrated component (e.g., device readable medium 1980 may comprise multiple separate hard drives as well as multiple RAM modules).

Similarly, network node 1960 may be composed of multiple physically separate components (e.g., a NodeB component and a RNC component, or a BTS component and a BSC component, etc.), which may each have their own respective components. In certain scenarios in which network node 1960 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1960 may be configured to support multiple radio access technologies (RATs). In such embodiments, some components may be duplicated (e.g., separate device readable medium 1980 for the different RATS) and some components may be reused (e.g., the same antenna 1962 may be shared by the RATs). Network node 1960 may also include multiple sets of the various illustrated components for different wireless technologies integrated into network node 1960, such as, for example, GSM, WCDMA, LIE, NR, WiFi, or Bluetooth wireless technologies. These wireless technologies may be integrated into the same or different chip or set of chips and other components within network node 1960.

Processing circuitry 1970 is configured to perform any determining, calculating, or similar operations (e.g., certain obtaining operations) described herein as being provided by a network node. These operations performed by processing circuitry 1970 may include processing information obtained by processing circuitry 1970 by, for example, converting the obtained information into other information, comparing the obtained information or converted information to information stored in the network node, and/or performing one or more operations based on the obtained information or converted information, and as a result of said processing making a determination.

Processing circuitry 1970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1960 components, such as device readable medium 1980, network node 1960 functionality. For example, processing circuitry 1970 may execute instructions stored in device readable medium 1980 or in memory within processing circuitry 1970. Such functionality may include providing any of the various wireless features, functions, or benefits discussed herein, in some embodiments, processing circuitry 1970 may include a system on a chip (SOC).

In some embodiments, processing circuitry 1970 may include one or more of radio frequency (RF) transceiver circuitry 1972 and baseband processing circuitry 1974. In some embodiments, radio frequency (RF) transceiver circuitry 1972 and baseband processing circuitry 1974 may be on separate chips (or sets of chips), boards, or units, such as radio units and digital units. In alternative embodiments, part or all of RF transceiver circuitry 1972 and baseband processing circuitry 1974 may be on the same chip or set of chips, boards, or units In certain embodiments, some or all of the functionality described herein as being provided by a network node, base station, eNB or other such network device may be performed by processing circuitry 1970 executing instructions stored on device readable medium 1980 or memory within processing circuitry 1970. In alternative embodiments, some or all of the functionality may be provided by processing circuitry 1970 without executing instructions stored on a separate or discrete device readable medium, such as in a hard-wired manner. In any of those embodiments, whether executing instructions stored on a device readable storage medium or not, processing circuitry 1970 can be configured to perform the described functionality. The benefits provided by such functionality are not limited to processing circuitry 1970 alone or to other components of network node 1960, but are enjoyed by network node 1960 as a whole, and/or by end users and the wireless network generally.

Device readable medium 1980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1970. Device readable medium 1980 may store any suitable instructions, data or information, including a computer program, software, an application including one or more of logic, rules, code, tables, etc. and/or other instructions capable of being executed by processing circuitry 1970 and, utilized by network node 1960. Device readable medium 1980 may be used to store any calculations made by processing circuitry 1970 and/or any data received via interface 1990. In some embodiments, processing circuitry 1970 and device readable medium 1980 may be considered to be integrated.

Interface 1990 is used in the wired or wireless communication of signalling and/or data between network node 1960, network 1906, and/or WDs 1910. As illustrated, interface 1990 comprises port(s)/terminal(s) 1994 to send and receive data, for example to and from network 1906 over a wired connection. Interface 1990 also includes radio front end circuitry 1992 that may be coupled to, or in certain embodiments a part of, antenna 1962. Radio front end circuitry 1992 comprises filters 1998 and amplifiers 1996. Radio front end circuitry 1992 may be connected to antenna 1962 and processing circuitry 1970. Radio front end circuitry may be configured to condition signals communicated between antenna 1962 and processing circuitry 1970. Radio front end circuitry 1992 may receive digital data that is to be sent out to other network nodes or WDs via a wireless connection. Radio front end circuitry 1992 may convert the digital data into a radio signal having the appropriate channel and bandwidth parameters using a combination of filters 1998 and/or amplifiers 1996. The radio signal may then be transmitted via antenna 1962. Similarly, when receiving data, antenna 1962 may collect radio signals which are then converted into digital data by radio front end circuitry 1992. The digital data may be passed to processing circuitry 1970. In other embodiments, the interface may comprise different components and/or different combinations of components.

In certain alternative embodiments, network node 1960 may not include separate radio front end circuitry 1992, instead, processing circuitry 1970 may comprise radio front end circuitry and may be connected to antenna 1962 without separate radio front end circuitry 1992. Similarly, in some embodiments, all or some of RF transceiver circuitry 1972 may be considered a part of interface 1990. In still other embodiments, interface 1990 may include one or more ports or terminals 1994, radio front end circuitry 1992, and RF transceiver circuitry 1972, as part of a radio unit (not shown), and interface 1990 may communicate with baseband processing circuitry 1974, which is part of a digital unit (not shown).

Antenna 1962 may include one or more antennas, or antenna arrays, configured to send and/or receive wireless signals. Antenna 1962 may be coupled to radio front end circuitry 1990 and may be any type of antenna capable of transmitting and receiving data and/or signals wirelessly. In some embodiments, antenna 1962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO, in certain embodiments, antenna 1962 may be separate from network node 1960 and may be connectable to network node 1960 through an interface or port.

Antenna 1962, interface 1990, and/or processing circuitry 1970 may be configured to perform any receiving operations and/or certain obtaining operations described herein as being performed by a network node. Any information, data and/or signals may be received from a wireless device, another network node and/or any other network equipment. Similarly, antenna 1962, interface 1990, and/or processing circuitry 1970 may be configured to perform any transmitting operations described herein as being performed by a network node. Any information, data and/or signals may be transmitted to a wireless device, another network node and/or any other network equipment.

Power circuitry 1987 may comprise, or be coupled to, power management circuitry and is configured to supply the components of network node 1960 with power for performing the functionality described herein. Power circuitry 1987 may receive power from power source 1986. Power source 1986 and/or power circuitry 1987 may be configured to provide power to the various components of network node 1960 in a form suitable for the respective components (e.g., at a voltage and current level needed for each respective component). Power source 1986 may either be included in, or external to, power circuitry 1987 and/or network node 1960. For example, network node 1960 may be connectable to an external power source (e.g., an electricity outlet) via an input circuitry or interface such as an electrical cable, whereby the external power source supplies power to power circuitry 1987. As a further example, power source 1986 may comprise a source of power in the form of a battery or battery pack which is connected to, or integrated in, power circuitry 1987. The battery may provide backup power should the external power source fail. Other types of power sources, such as photovoltaic devices, may also be used.

Alternative embodiments of network node 1960 may include additional components beyond those shown in FIG. 19 that may be responsible for providing certain aspects of the network node's functionality, including any of the functionality described herein and/or any functionality necessary to support the subject matter described herein. For example, network node 1960 may include user interface equipment to allow input of information into network node 1960 and to allow output of information from network node 1960. This may allow a user to perform diagnostic, maintenance, repair, and other administrative functions for network node 1960.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as a machine-type communication (MTC) device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1910 includes antenna 1911, interface 1914, processing circuitry 1920, device readable medium 1930, user interface equipment 1932, auxiliary equipment 1934, power source 1936 and power circuitry 1937. WD 1910 may include multiple sets of one or more of the illustrated components for different wireless technologies supported by WD 1910, such as, for example, GSM, WCDMA, LTE, NR, WiFi, WiMAX, or Bluetooth wireless technologies, just to mention a few. These wireless technologies may be integrated into the same or different chips or set of chips as other components within WD 1910.

Antenna 1911 may include one or more antennas or antenna arrays, configured to send and/or receive wireless signals, and is connected to interface 1914. In certain alternative embodiments, antenna 1911 may be separate from WD 1910 and be connectable to WD 1910 through an interface or port. Antenna 1911, interface 1914, and/or processing circuitry 1920 may be configured to perform any receiving or transmitting operations described herein as being performed by a WD. Any information, data and/or signals may be received from a network node and/or another WD. In some embodiments, radio front end circuitry and/or antenna 1911 may be considered an interface.

As illustrated, interface 1914 comprises radio front end circuitry 1912 and antenna 1911. Radio front end circuitry 1912 comprise one or more filters 1918 and amplifiers 1916. Radio front end circuitry 1914 is connected to antenna 1911 and processing circuitry 1920, and is configured to condition signals communicated between antenna 1911 and processing circuitry 1920. Radio front end circuitry 1912 may be coupled to or a part of antenna 1911. In some embodiments, WD 1910 may not include separate radio front end circuitry 1912; rather, processing circuitry 1920 may comprise radio front end circuitry and may be connected to antenna 1911. Similarly, in some embodiments, some or all of RF transceiver circuitry 1922 may be considered a part of interface 1914. Radio front end circuitry 1912 may receive digital data that is to be sent out to other network nodes or WDs via a wireless connection. Radio front end circuitry 1912 may convert the digital data into a radio signal having the appropriate channel and bandwidth parameters using a combination of filters 1918 and/or amplifiers 1916. The radio signal may then be transmitted via antenna 1911. Similarly, when receiving data, antenna 1911 may collect radio signals which are then converted into digital data by radio front end circuitry 1912. The digital data may be passed to processing circuitry 1920. In other embodiments, the interface may comprise different components and/or different combinations of components.

Processing circuitry 1920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1910 components, such as device readable medium 1930, WD 1910 functionality. Such functionality may include providing any of the various wireless features or benefits discussed herein. For example, processing circuitry 1920 may execute instructions stored in device readable medium 1930 or in memory within processing circuitry 1920 to provide the functionality disclosed herein.

As illustrated, processing circuitry 1920 includes one or more of RF transceiver circuitry 1922, baseband processing circuitry 1924, and application processing circuitry 1926. In other embodiments, the processing circuitry may comprise different components and/or different combinations of components. In certain embodiments processing circuitry 1920 of WD 1910 may comprise a SOC. In some embodiments, RF transceiver circuitry 1922, baseband processing circuitry 1924, and application processing circuitry 1926 may be on separate chips or sets of chips. In alternative embodiments, part or all of baseband processing circuitry 1924 and application processing circuitry 1926 may be combined into one chip or set of chips, and RF transceiver circuitry 1922 may be on a separate chip or set of chips. In still alternative embodiments, part or all of RF transceiver circuitry 1922 and baseband processing circuitry 1924 may be on the same chip or set of chips, and application processing circuitry 1926 may be on a separate chip or set of chips. In yet other alternative embodiments, part or all of RF transceiver circuitry 1922, baseband processing circuitry 1924, and application processing circuitry 1926 may be combined in the same chip or set of chips. In some embodiments, RF transceiver circuitry 1922 may be a part of interface 1914. RF transceiver circuitry 1922 may condition RF signals for processing circuitry 1920.

In certain embodiments, some or all of the functionality described herein as being performed by a WD may be provided by processing circuitry 1920 executing instructions stored on device readable medium 1930, which in certain embodiments may be a computer-readable storage medium. In alternative embodiments, some or all of the functionality may be provided by processing circuitry 1920 without executing instructions stored on a separate or discrete device readable storage medium, such as in a hard-wired manner. In any of those particular embodiments, whether executing instructions stored on a device readable storage medium or not, processing circuitry 1920 can be configured to perform the described functionality. The benefits provided by such functionality are not limited to processing circuitry 1920 alone or to other components of WD 1910, but are enjoyed by WD 1910 as a whole, and/or by end users and the wireless network generally.

Processing circuitry 1920 may be configured to perform any determining, calculating, or similar operations (e.g., certain obtaining operations) described herein as being performed by a WD. These operations, as performed by processing circuitry 1920, may include processing information obtained by processing circuitry 1920 by, for example, converting the obtained information into other information, comparing the obtained information or converted information to information stored by WD 1910, and/or performing one or more operations based on the obtained information or converted information, and as a result of said processing making a determination.

Device readable medium 1930 may be operable to store a computer program, software, an application including one or more of logic, rules, code, tables, etc. and/or other instructions capable of being executed by processing circuitry 1920. Device readable medium 1930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1920. In some embodiments, processing circuitry 1920 and device readable medium 1930 may be considered to be integrated.

User interface equipment 1932 may provide components that allow for a human user to interact with WD 1910. Such interaction may be of many forms, such as visual, audial, tactile, etc. User interface equipment 1932 may be operable to produce output to the user and to allow the user to provide input to WD 1910. The type of interaction may vary depending on the type of user interface equipment 1932 installed in WD 1910. For example, if WD 1910 is a smart phone, the interaction may be via a touch screen; if WD 1910 is a smart meter, the interaction may be through a screen that provides usage (e.g., the number of gallons used) or a speaker that provides an audible alert (e.g., if smoke is detected). User interface equipment 1932 may include input interfaces, devices and circuits, and output interfaces, devices and circuits. User interface equipment 1932 is configured to allow input of information into WD 1910, and is connected to processing circuitry 1920 to allow processing circuitry 1920 to process the input information. User interface equipment 1932 may include, for example, a microphone, a proximity or other sensor, keys/buttons, a touch display, one or more cameras, a USB port, or other input circuitry. User interface equipment 1932 is also configured to allow output of information from WD 1910, and to allow processing circuitry 1920 to output information from WD 1910. User interface equipment 1932 may include, for example, a speaker, a display, vibrating circuitry, a USB port, a headphone interface, or other output circuitry. Using one or more input and output interfaces, devices, and circuits, of user interface equipment 1932, WD 1910 may communicate with end users and/or the wireless network, and allow them to benefit from the functionality described herein.

Auxiliary equipment 1934 is operable to provide more specific functionality which may not be generally performed by WDs. This may comprise specialized sensors for doing measurements for various purposes, interfaces for additional types of communication such as wired communications etc. The inclusion and type of components of auxiliary equipment 1934 may vary depending on the embodiment and/or scenario.

Power source 1936 may, in some embodiments, be in the form of a battery or battery pack. Other types of power sources, such as an external power source e.g., an electricity outlet), photovoltaic devices or power cells, may also be used. WD 1910 may further comprise power circuitry 1937 for delivering power from power source 1936 to the various parts of WD 1910 which need power from power source 1936 to carry out any functionality described or indicated herein. Power circuitry 1937 may in certain embodiments comprise power management circuitry. Power circuitry 1937 may additionally or alternatively be operable to receive power from an external power source; in which case WD 1910 may be connectable to the external power source (such as an electricity outlet) via input circuitry or an interface such as an electrical power cable. Power circuitry 1937 may also in certain embodiments be operable to deliver power from an external power source to power source 1936. This may be, for example, for the charging of power source 1936. Power circuitry 1937 may perform any formatting, converting, or other modification to the power from power source 1936 to make the power suitable for the respective components of WD 1910 to which power is supplied.

Figure 20:
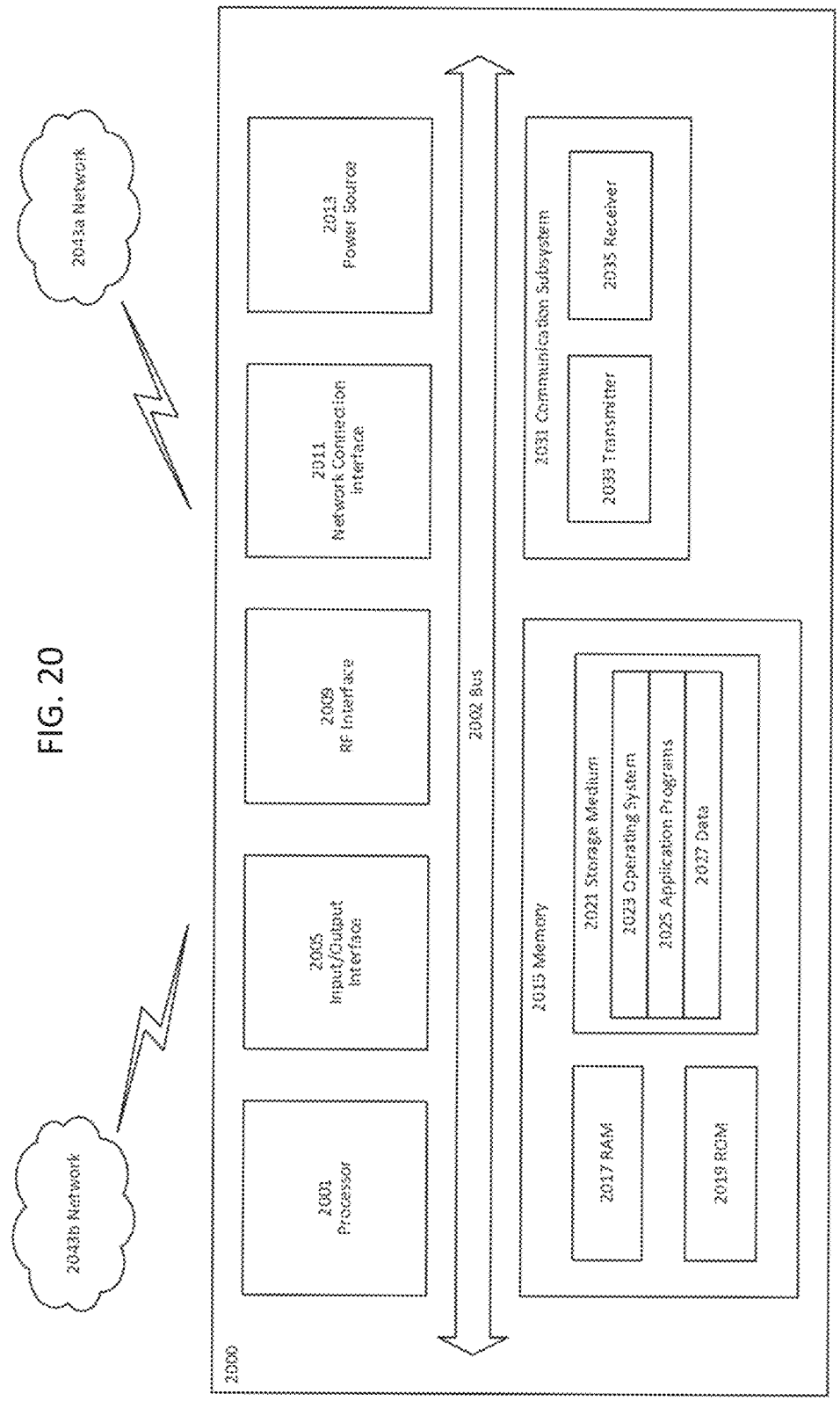
FIG. 20 is a block diagram illustrating elements of a UE according to some embodiments of inventive concepts.

FIG. 20 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user. A UE may also comprise any UE identified by the 3rd Generation Partnership Project (3GPP), including a NB-IoT UE that is not intended for sale to, or operation by, a human user. UE 2000, as illustrated in FIG. 20, is one example of a WD configured for communication in accordance with one or more communication standards promulgated by the 3rd Generation Partnership Project (3GPP), such as 3GPP's GSM, UMTS, UE, and/or 5G standards. As mentioned previously, the term WD and UE may be used interchangeable. Accordingly, although FIG. 20 is a UE, the components discussed herein are equally applicable to a WD, and vice-versa.

In FIG. 20, UE 2000 includes processing circuitry 2001 that is operatively coupled to input/output interface 2005, radio frequency (RF) interface 2009, network connection interface 2011, memory 2015 including random access memory (RAM) 2017, read-only memory (ROM) 2019, and storage medium 2021 or the like, communication subsystem 2031, power source 2033, and/or any other component, or any combination thereof. Storage medium 2021 includes operating system 2023, application program 2025, and data 2027. In other embodiments, storage medium 2021 may include other similar types of information. Certain UEs may utilize all of the components shown in FIG. 20, or only a subset of the components. The level of integration between the components may vary from one UE to another UE. Further, certain UEs may contain multiple instances of a component, such as multiple processors, memories, transceivers, transmitters, receivers, etc.

In FIG. 20, processing circuitry 2001 may be configured to process computer instructions and data. Processing circuitry 2001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2001 may include two central processing units (CPUs). Data may be information in a form suitable for use by a computer.

In the depicted embodiment, input/output interface 2005 may be configured to provide a communication interface to an input device, output device, or input and output device. UE 2000 may be configured to use an output device via input/output interface 2005. An output device may use the same type of interface port as an input device. For example, a USB port may be used to provide input to and output from UE 2000. The output device may be a speaker, a sound card, a video card, a display, a monitor, a printer, an actuator, an emitter, a smartcard, another output device, or any combination thereof. UE 2000 may be configured to use an input device via input/output interface 2005 to allow a user to capture information into UE 2000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 20, RF interface 2009 may be configured to provide a communication interface to RF components such as a transmitter, a receiver, and an antenna. Network connection interface 2011 may be configured to provide a communication interface to network 2043a. Network 2043a may encompass wired and/or wireless networks such as a local-area network (LAN), a wide-area network (WAN), a computer network, a wireless network, a telecommunications network, another like network or any combination thereof. For example, network 2043a may comprise a Wi-Fi network. Network connection interface 2011 may be configured to include a receiver and a transmitter interface used to communicate with one or more other devices over a communication network according to one or more communication protocols, such as Ethernet, TCP/IP, SONET, ATM, or the like. Network connection interface 2011 may implement receiver and transmitter functionality appropriate to the communication network links (e.g., optical, electrical, and the like). The transmitter and receiver functions may share circuit components, software or firmware, or alternatively may be implemented separately.

RAM 2017 may be configured to interface via bus 2002 to processing circuitry 2001 to provide storage or caching of data or computer instructions during the execution of software programs such as the operating system, application programs, and device drivers. ROM 2019 may be configured to provide computer instructions or data to processing circuitry 2001. For example, ROM 2019 may be configured to store invariant low-level system code or data for basic system functions such as basic input and output (I/O), startup, or reception of keystrokes from a keyboard that are stored in a non-volatile memory. Storage medium 2021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 2021 may be configured to include operating system 2023, application program 2025 such as a web browser application, a widget or gadget engine or another application, and data file 2027. Storage medium 2021 may store, for use by UE 2000, any of a variety of various operating systems or combinations of operating systems.

Storage medium 2021 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2021 may allow UE 2000 to access computer-executable instructions, application programs or the like, stored on transitory or non-transitory memory media, to off-load data, or to upload data. An article of manufacture, such as one utilizing a communication system may be tangibly embodied in storage medium 2021, which may comprise a device readable medium.

In FIG. 20, processing circuitry 2001 may be configured to communicate with network 2043b using communication subsystem 2031. Network 2043a and network 2043b may be the same network or networks or different network or networks. Communication subsystem 2031 may be configured to include one or more transceivers used to communicate with network 2043b. For example, communication subsystem 2031 may be configured to include one or more transceivers used to communicate with one or more remote transceivers of another device capable of wireless communication such as another WD, UE, or base station of a radio access network (RAN) according to one or more communication protocols, such as IEEE 802.20, CDMA, WCDMA, GSM, LTE, URAN, WiMax, or the like. Each transceiver may include transmitter 2033 and/or receiver 2035 to implement transmitter or receiver functionality, respectively, appropriate to the RAN links (e.g., frequency allocations and the like). Further, transmitter 2033 and receiver 2035 of each transceiver may share circuit components, software or firmware, or alternatively may be implemented separately.

In the illustrated embodiment, the communication functions of communication subsystem 2031 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 2031 may include cellular communication, Wi-Fi communication, Bluetooth communication, and GPS communication. Network 2043b may encompass wired and/or wireless networks such as a local-area network (LAN), a wide-area network (WAN), a computer network, a wireless network, a telecommunications network, another like network or any combination thereof. For example, network 2043b may be a cellular network, a network, and/or a near-field network. Power source 2013 may be configured to provide alternating current (AC) or direct current (DC) power to components of UE 2000.

The features, benefits and/or functions described herein may be implemented in one of the components of UE 2000 or partitioned across multiple components of UE 2000. Further, the features, benefits, and/or functions described herein may be implemented in any combination of hardware, software or firmware. In one example, communication subsystem 2031 may be configured to include any of the components described herein. Further, processing circuitry 2001 may be configured to communicate with any of such components over bus 2002. In another example, any of such components may be represented by program instructions stored in memory that when executed by processing circuitry 2001 perform the corresponding functions described herein. In another example, the functionality of any of such components may be partitioned between processing circuitry 2001 and communication subsystem 2031. In another example, the non-computationally intensive functions of any of such components may be implemented in software or firmware and the computationally intensive functions may be implemented in hardware.

Figure 21:
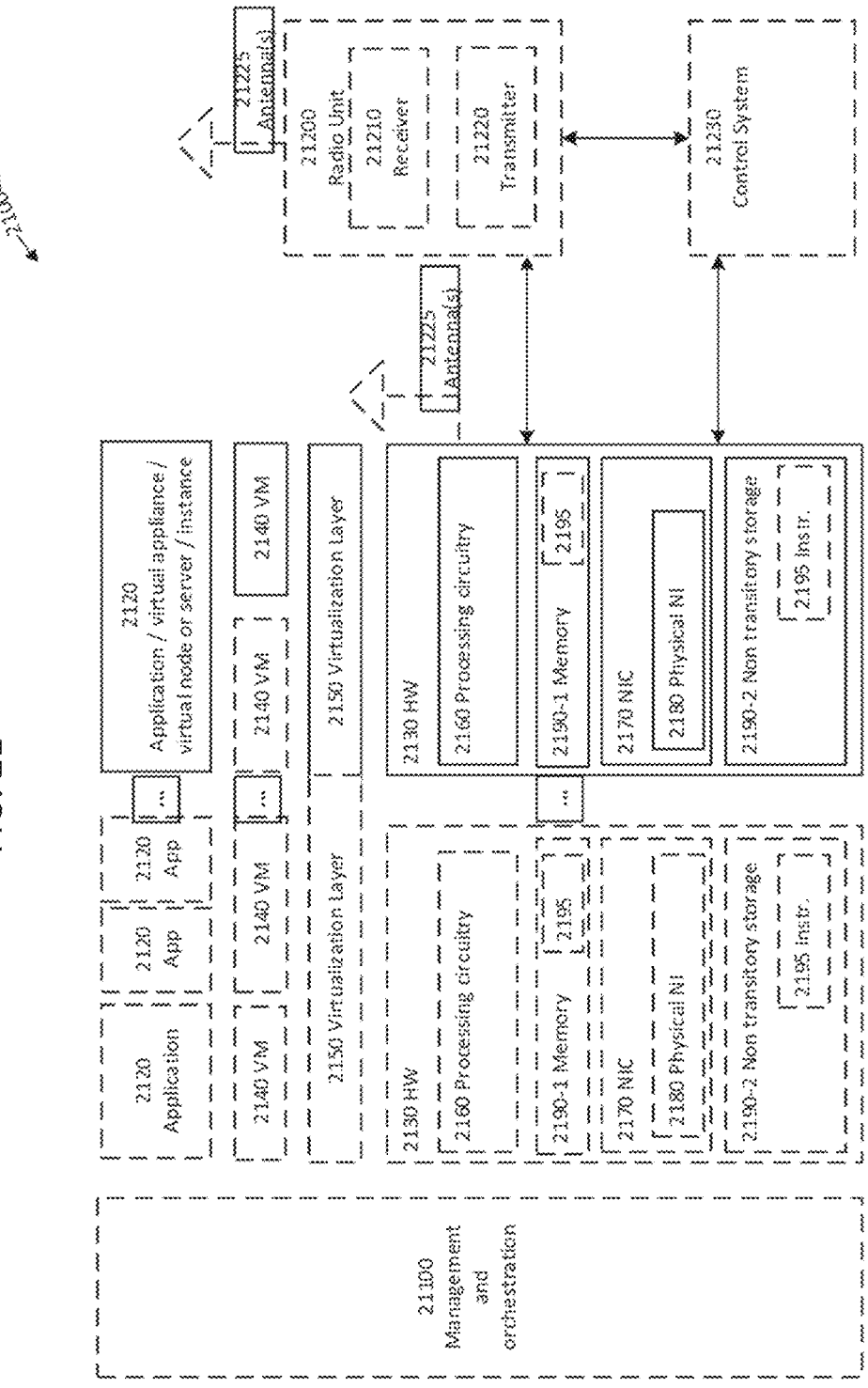
FIG. 21 is a block diagram illustrating a virtualization environment according to some embodiments of inventive concepts.

FIG. 21 is a schematic block diagram illustrating a virtualization environment 2100 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2100 hosted by one or more of hardware nodes 2130. Further, in embodiments in which the virtual node is not a radio access node or does not require radio connectivity (e.g., a core network node), then the network node may be entirely virtualized.

The functions may be implemented by one or more applications 2120 (which may alternatively be called software instances, virtual appliances, network functions, virtual nodes, virtual network functions, etc.) operative to implement some of the features, functions, and/or benefits of some of the embodiments disclosed herein. Applications 2120 are run in virtualization environment 2100 which provides hardware 2130 comprising processing circuitry 2160 and memory 2190. Memory 2190 contains instructions 2195 executable by processing circuitry 2160 whereby application 2120 is operative to provide one or more of the features, benefits, and/or functions disclosed herein.

Virtualization environment 2100, comprises general-purpose or special-purpose network hardware devices 2130 comprising a set of one or more processors or processing circuitry 2160, which may be commercial off-the-shelf (COTS) processors, dedicated Application Specific Integrated Circuits (ASICs), or any other type of processing circuitry including digital or analog hardware components or special purpose processors. Each hardware device may comprise memory 2190-1 which may be non-persistent memory for temporarily storing instructions 2195 or software executed by processing circuitry 2160. Each hardware device may comprise one or more network interface controllers (NICs) 2170, also known as network interface cards, which include physical network interface 2180. Each hardware device may also include non-transitory, persistent, machine-readable storage media 2190-2 having stored therein software 2195 and/or instructions executable by processing circuitry 2160. Software 2195 may include any type of software including software for instantiating one or more virtualization layers 2150 (also referred to as hypervisors), software to execute virtual machines 2140 as well as software allowing it to execute functions, features and/or benefits described in relation with some embodiments described herein.

Virtual machines 2140, comprise virtual processing, virtual memory, virtual networking or interface and virtual storage, and may be run by a corresponding virtualization layer 2150 or hypervisor. Different embodiments of the instance of virtual appliance 2120 may be implemented on one or more of virtual machines 2140, and the implementations may be made in different ways.

During operation, processing circuitry 2160 executes software 2195 to instantiate the hypervisor or virtualization layer 2150, which may sometimes be referred to as a virtual machine monitor (VMM). Virtualization layer 2150 may present a virtual operating platform that appears like networking hardware to virtual machine 2140.

As shown in FIG. 21, hardware 2130 may be a standalone network node with generic or specific components. Hardware 2130 may comprise antenna 21225 and may implement some functions via virtualization. Alternatively, hardware 2130 may be part of a larger cluster of hardware (e.g. such as in a data center or customer premise equipment (CPE)) where many hardware nodes work together and are managed via management and orchestration (MANO) 21100, which, among others, oversees lifecycle management of applications 2120.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 2140 may be a software implementation of a physical machine that runs programs as if they were executing on a physical, non-virtualized machine. Each of virtual machines 2140, and that part of hardware 2130 that executes that virtual machine, be it hardware dedicated to that virtual machine and/or hardware shared by that virtual machine with others of the virtual machines 2140, forms a separate virtual network elements (VNE).

Still in the context of NFV, Virtual Network Function (VNF) is responsible for handling specific network functions that run in one or more virtual machines 2140 on top of hardware networking infrastructure 2130 and corresponds to application 2120 in FIG. 21.

In some embodiments, one or more radio units 21200 that each include one or more transmitters 21220 and one or more receivers 21210 may be coupled to one or more antennas 21225. Radio units 21200 may communicate directly with hardware nodes 2130 via one or more appropriate network interfaces and may be used in combination with the virtual components to provide a virtual node with radio capabilities, such as a radio access node or a base station.

In some embodiments, some signalling can be affected with the use of control system 21230 which may alternatively be used for communication between the hardware nodes 2130 and radio units 21200.

Figure 22:
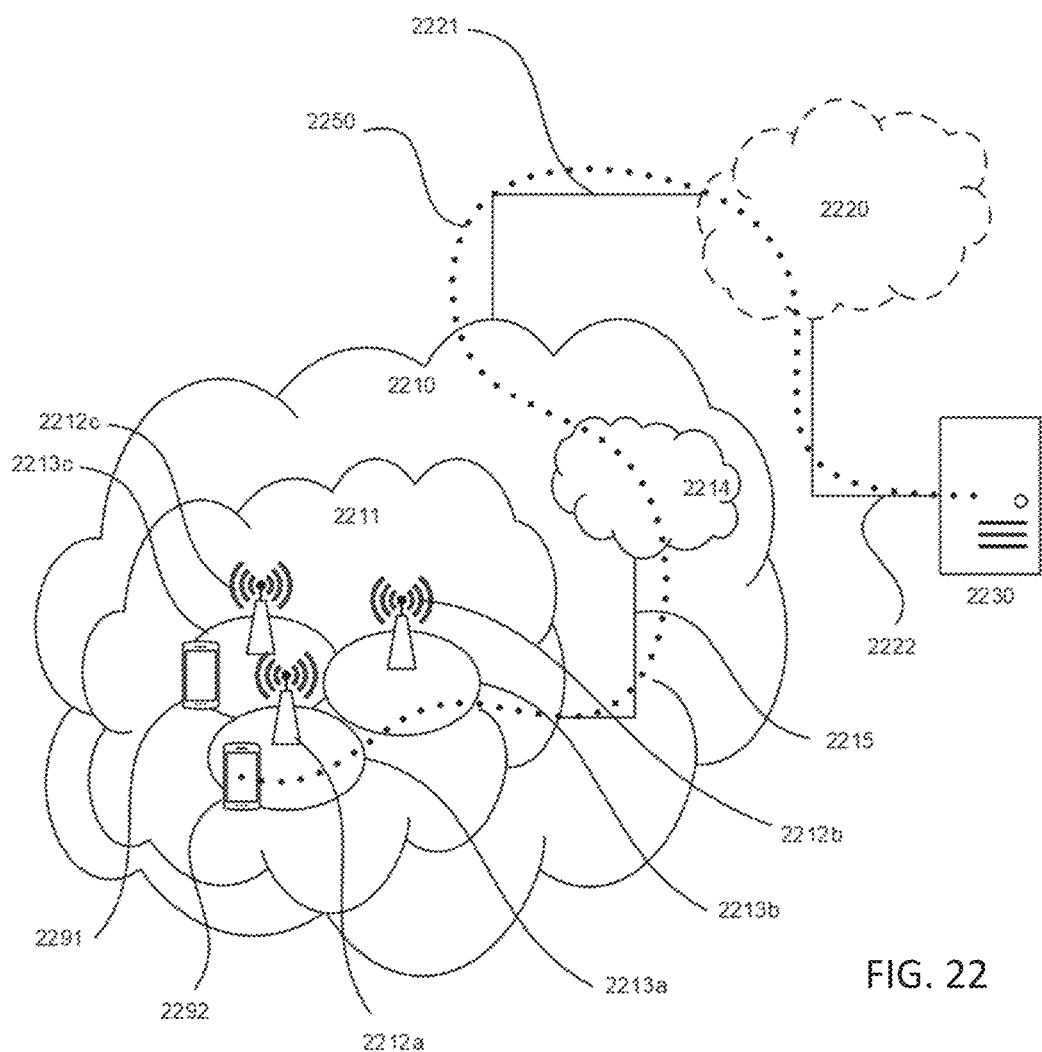
FIG. 22 is a schematic diagram illustrating a telecommunication network connected via an intermediate network to a host computer according to some embodiments of inventive concepts.

FIG. 22 illustrates a telecommunication network connected via an intermediate network to a host computer according to some embodiments of inventive concepts. With reference to FIG. 22, in accordance with an embodiment, a communication system includes telecommunication network 2210, such as a 3GPP-type cellular network, which comprises access network 2211, such as a radio access network, and core network 2214. Access network 2211 comprises a plurality of base stations 2212a, 2212b, 2212c, such as NBs, eNBs, gNBs or other types of wireless access points, each defining a corresponding coverage area 2213a, 2213b, 2213c. Each base station 2212a, 2212b, 2212c is connectable to core network 2214 over a wired or wireless connection 2215. A first UE 2291 located in coverage area 2213c is configured to wirelessly connect to, or be paged by, the corresponding base station 2212c. A second UE 2292 in coverage area 2213a is wirelessly connectable to the corresponding base station 2212a. While a plurality of UEs 2291, 2292 are illustrated in this example, the disclosed embodiments are equally applicable to a situation where a sole UE is in the coverage area or where a sole UE is connecting to the corresponding base station 2212.

Telecommunication network 2210 is itself connected to host computer 2230, which may be embodied in the hardware and/or software of a standalone server, a cloud-implemented server, a distributed server or as processing resources in a server farm. Host computer 2230 may be under the ownership or control of a service provider, or may be operated by the service provider or on behalf of the service provider. Connections 2221 and 2222 between telecommunication network 2210 and host computer 2230 may extend directly from core network 2214 to host computer 2230 or may go via an optional intermediate network 2220. Intermediate network 2220 may be one of, or a combination of more than one of, a public, private or hosted network; intermediate network 2220, if any, may be a backbone network or the Internet; in particular, intermediate network 2220 may comprise two or more sub-networks (not shown).

Figure 23:
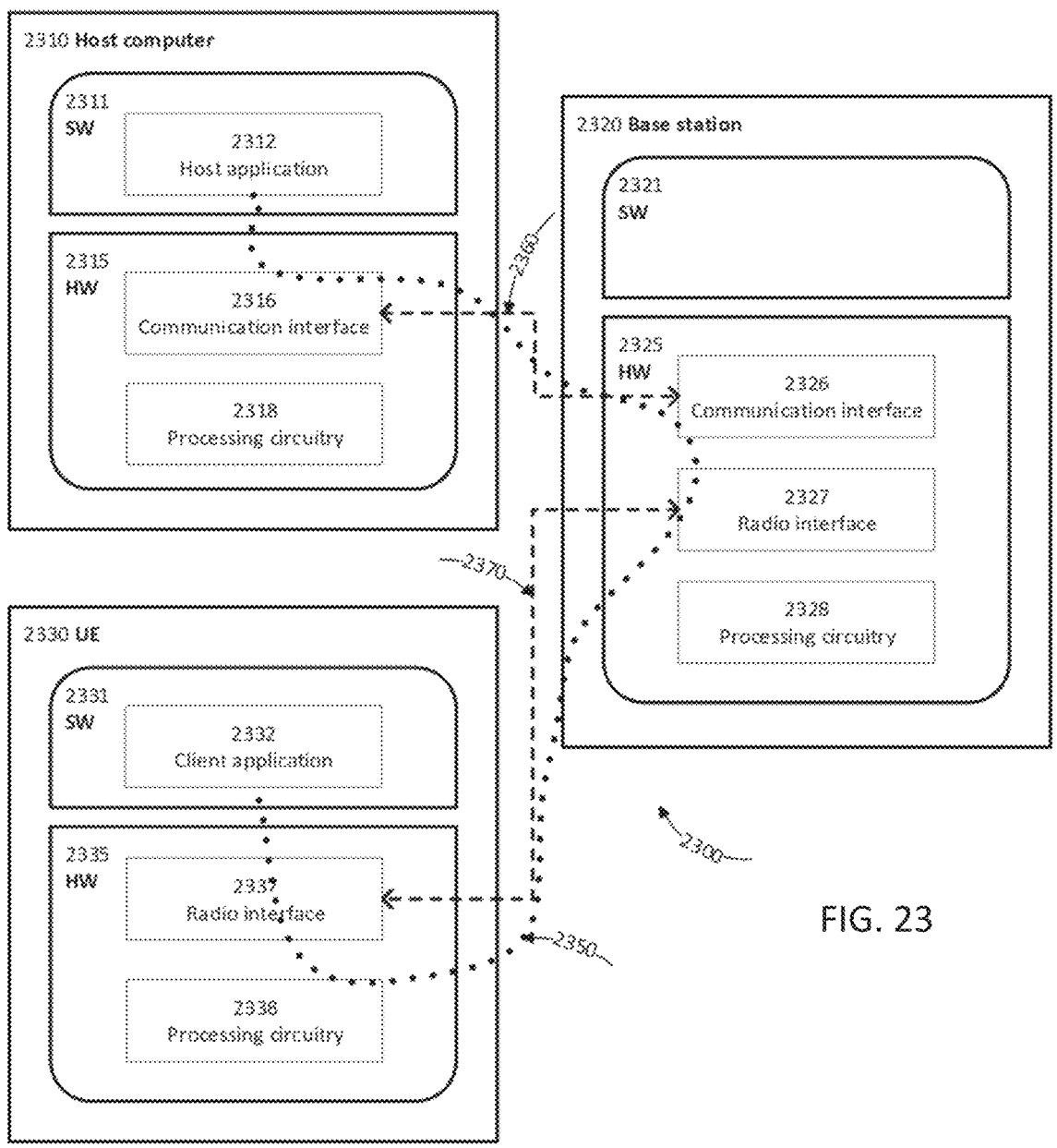
FIG. 23 is a schematic diagram illustrating a host computer communicating via a base station with a user equipment over a partially wireless connection according to some embodiments of inventive concepts.

The communication system of FIG. 22 as a whole enables connectivity between the connected UEs 2291, 2292 and host computer 2230. The connectivity may be described as an over-the-top (OTT) connection 2250. Host computer 2230 and the connected UEs 2291, 2292 are configured to communicate data and/or signaling via OTT connection 2250, using access network 2211, core network 2214, any intermediate network 2220 and possible further infrastructure (not shown) as intermediaries. OTT connection 2250 may be transparent in the sense that the participating communication devices through which OTT connection 2250 passes are unaware of routing of uplink and downlink communications. For example, base station 2212 may not or need not be informed about the past routing of an incoming downlink communication with data originating from host computer 2230 to be forwarded (e.g., handed over) to a connected UE 2291. Similarly, base station 2212 need not be aware of the future routing of an outgoing uplink communication originating from the UE 2291 towards the host computer 2230. FIG. 23 illustrates a host computer communicating via a base station with a user equipment over a partially wireless connection according to some embodiments of inventive concepts, Example implementations, in accordance with an embodiment, of the UE, base station and host computer discussed in the preceding paragraphs will now be described with reference to FIG. 23. In communication system 2300, host computer 2310 comprises hardware 2315 including communication interface 2316 configured to set up and maintain a wired or wireless connection with an interface of a different communication device of communication system 2300. Host computer 2310 further comprises processing circuitry 2318, which may have storage and/or processing capabilities. In particular, processing circuitry 2318 may comprise one or more programmable processors, application-specific integrated circuits, field programmable gate arrays or combinations of these (not shown) adapted to execute instructions. Host computer 2310 further comprises software 2311, which is stored in or accessible by host computer 2310 and executable by processing circuitry 2318. Software 2311 includes host application 2312. Host application 2312 may be operable to provide a service to a remote user, such as UE 2330 connecting via OTT connection 2350 terminating at UE 2330 and host computer 2310. In providing the service to the remote user, host application 2312 may provide user data which is transmitted using OTT connection 2350.

Communication system 2300 further includes base station 2320 provided in a telecommunication system and comprising hardware 2325 enabling it to communicate with host computer 2310 and with UE 2330. Hardware 2325 may include communication interface 2326 for setting up and maintaining a wired or wireless connection with an interface of a different communication device of communication system 2300, as well as radio interface 2327 for setting up and maintaining at least wireless connection 2370 with UE 2330 located in a coverage area (not shown in FIG. 23) served by base station 2320. Communication interface 2326 may be configured to facilitate connection 2360 to host computer 2310. Connection 2360 may be direct or it may pass through a core network (not shown in FIG. 23) of the telecommunication system and/or through one or more intermediate networks outside the telecommunication system. In the embodiment shown, hardware 2325 of base station 2320 further includes processing circuitry 2328, which may comprise one or more programmable processors, application-specific integrated circuits, field programmable gate arrays or combinations of these (not shown) adapted to execute instructions. Base station 2320 further has software 2321 stored internally or accessible via an external connection.

Communication system 2300 further includes UE 2330 already referred to. Its hardware 2335 may include radio interface 2337 configured to set up and maintain wireless connection 2370 with a base station serving a coverage area in which UE 2330 is currently located. Hardware 2335 of UE 2330 further includes processing circuitry 2338, which may comprise one or more programmable processors, application-specific integrated circuits, field programmable gate arrays or combinations of these (not shown) adapted to execute instructions. UE 2330 further comprises software 2331, which is stored in or accessible by UE 2330 and executable by processing circuitry 2338. Software 2331 includes client application 2332. Client application 2332 may be operable to provide a service to a human or non-human user via UE 2330, with the support of host computer 2310. In host computer 2310, an executing host application 2312 may communicate with the executing client application 2332 via OTT connection 2350 terminating at UE 2330 and host computer 2310. In providing the service to the user, client application 2332 may receive request data from host application 2312 and provide user data in response to the request data. OTT connection 2350 may transfer both the request data and the user data. Client application 2332 may interact with the user to generate the user data that it provides.

It is noted that host computer 2310, base station 2320 and UE 2330 illustrated in FIG. 23 may be similar or identical to host computer 2230, one of base stations 2212a, 2212b, 2212c and one of UEs 2291, 2292 of FIG. 22, respectively. This is to say, the inner workings of these entities may be as shown in FIG. 23 and independently, the surrounding network topology may be that of FIG. 22.

In FIG. 23, OTT connection 2350 has been drawn abstractly to illustrate the communication between host computer 2310 and UE 2330 via base station 2320, without explicit reference to any intermediary devices and the precise routing of messages via these devices. Network infrastructure may determine the routing, which it may be configured to hide from UE 2330 or from the service provider operating host computer 2310, or both. While OTT connection 2350 is active, the network infrastructure may further take decisions by which it dynamically changes the routing (e.g., on the basis of load balancing consideration or reconfiguration of the network).

Wireless connection 2370 between UE 2330 and base station 2320 is in accordance with the teachings of the embodiments described throughout this disclosure. One or more of the various embodiments improve the performance of OTT services provided to UE 2330 using OTT connection 2350, in which wireless connection 2370 forms the last segment. More precisely, the teachings of these embodiments may improve the latency and power consumption and thereby provide benefits such as better responsiveness and extended battery lifetime.

A measurement procedure may be provided for the purpose of monitoring data rate, latency and other factors on which the one or more embodiments improve. There may further be an optional network functionality for reconfiguring OTT connection 2350 between host computer 2310 and UE 2330, in response to variations in the measurement results. The measurement procedure and/or the network functionality for reconfiguring OTT connection 2350 may be implemented in software 2311 and hardware 2315 of host computer 2310 or in software 2331 and hardware 2335 of UE 2330, or both. In embodiments, sensors (not shown) may be deployed in or in association with communication devices through which OTT connection 2350 passes; the sensors may participate in the measurement procedure by supplying values of the monitored quantities exemplified above, or supplying values of other physical quantities from which software 2311, 2331 may compute or estimate the monitored quantities. The reconfiguring of OTT connection 2350 may include message format, retransmission settings, preferred routing etc.; the reconfiguring need not affect base station 2320, and it may be unknown or imperceptible to base station 2320. Such procedures and functionalities may be known and practiced in the art. In certain embodiments, measurements may involve proprietary UE signaling facilitating host computer 2310's measurements of throughput, propagation times, latency and the like. The measurements may be implemented in that software 2311 and 2331 causes messages to be transmitted, in particular empty or 'dummy' messages, using OTT connection 2350 while it monitors propagation times, errors etc.

Figure 24:
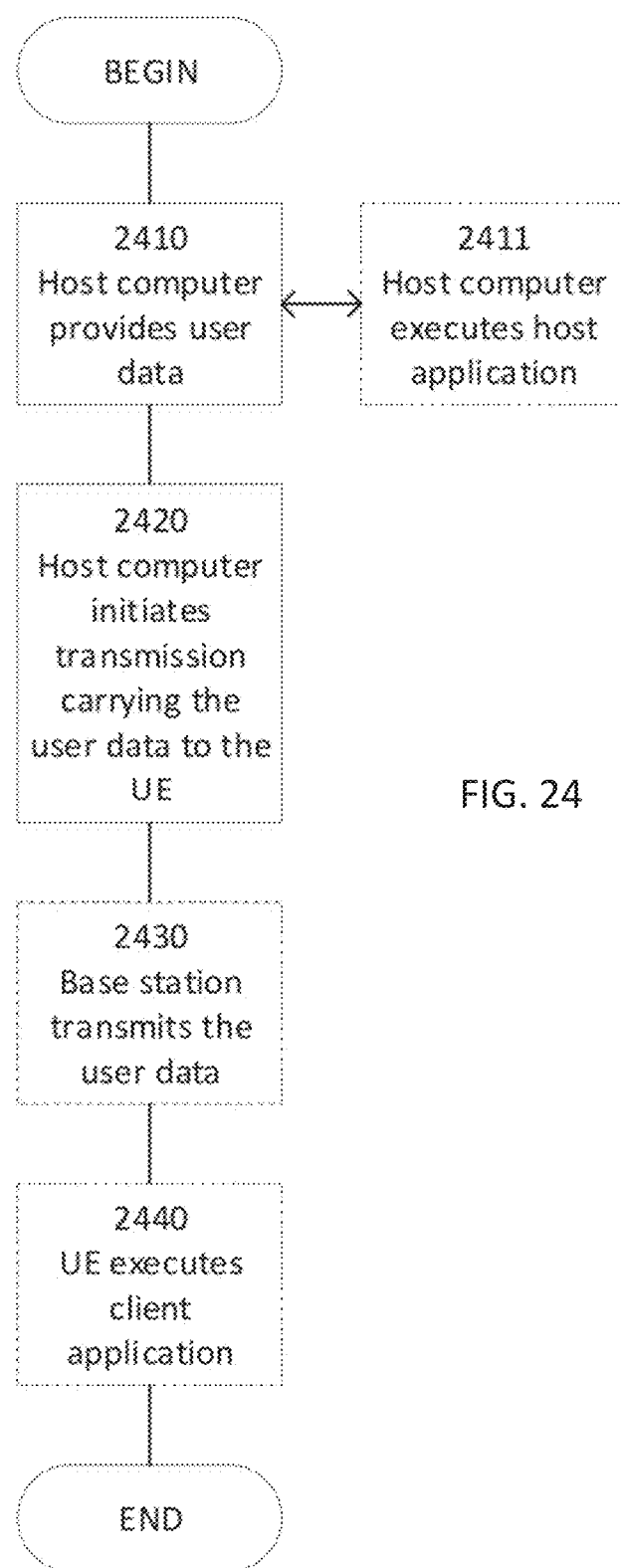
FIG. 24 is a flow chart illustrating methods implemented in a communication system including a host computer, a base station and a user equipment according to some embodiments of inventive concepts.

FIG. 24 is a flowchart illustrating methods implemented in a communication system including a host computer, a base station and a user equipment, in accordance with some embodiments. The communication system includes a host computer, a base station and a UE which may be those described with reference to FIGS. 22 and 23. For simplicity of the present disclosure, only drawing references to FIG. 24 will be included in this section. In step 2410, the host computer provides user data. In substep 2411 (which may be optional) of step 2410, the host computer provides the user data by executing a host application. In step 2420, the host computer initiates a transmission carrying the user data to the UE. In step 2430 (which may be optional), the base station transmits to the UE the user data which was carried in the transmission that the host computer initiated, in accordance with the teachings of the embodiments described throughout this disclosure. In step 2440 (which may also be optional), the UE executes a client application associated with the host application executed by the host computer.

Figure 25:
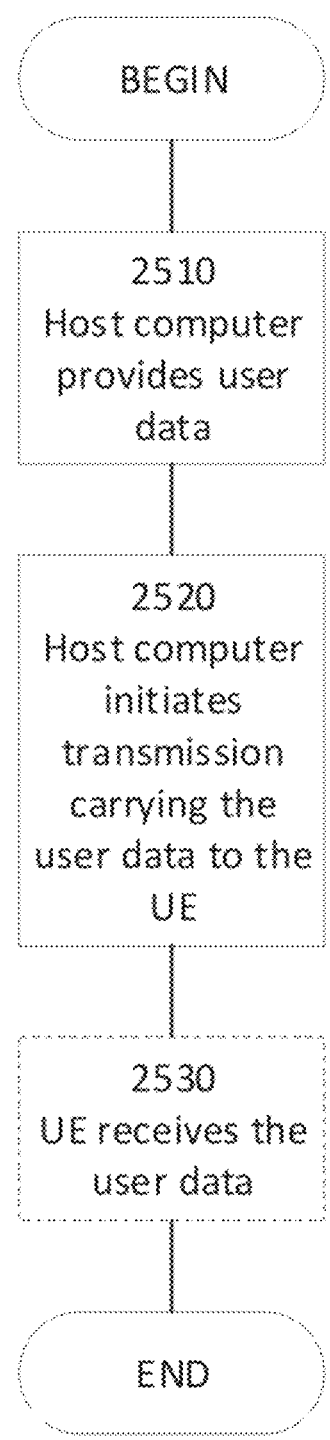
FIG. 25 is a flow chart illustrating methods implemented in a communication system including a host computer, a base station and a user equipment according to some embodiments of inventive concepts.

FIG. 25 is a flowchart illustrating methods implemented in a communication system including a host computer, a base station and a user equipment, in accordance with some embodiments. The communication system includes a host computer, a base station and a UE which may be those described with reference to FIGS. 22 and 23. For simplicity of the present disclosure, only drawing references to FIG. 25 will be included in this section. In step 2510 of the method, the host computer provides user data. In an optional substep (not shown) the host computer provides the user data by executing a host application. In step 2520, the host computer initiates a transmission carrying the user data to the UE. The transmission may pass via the base station, in accordance with the teachings of the embodiments described throughout this disclosure. In step 2530 (which may be optional), the UE receives the user data carried in the transmission.

Figure 26:
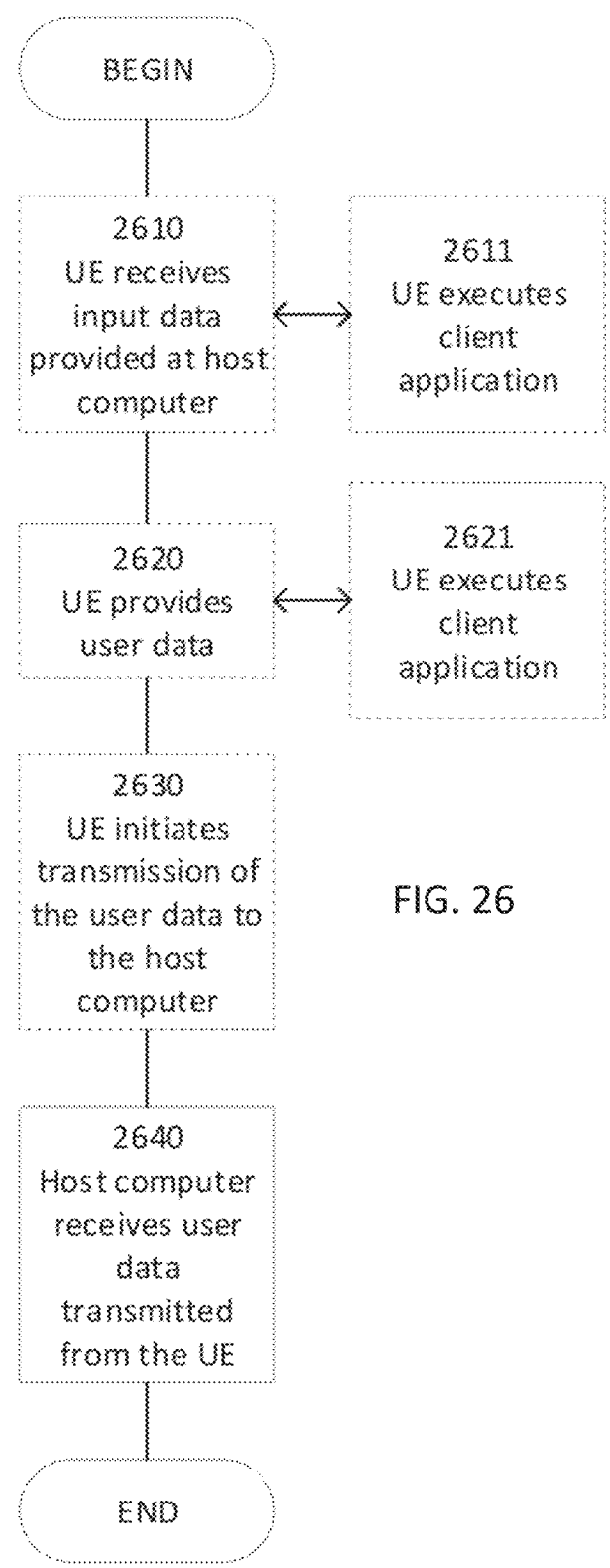
FIG. 26 is a flow chart illustrating methods implemented in a communication system including a host computer, a base station and a user equipment according to some embodiments of inventive concepts.
Figure 27:
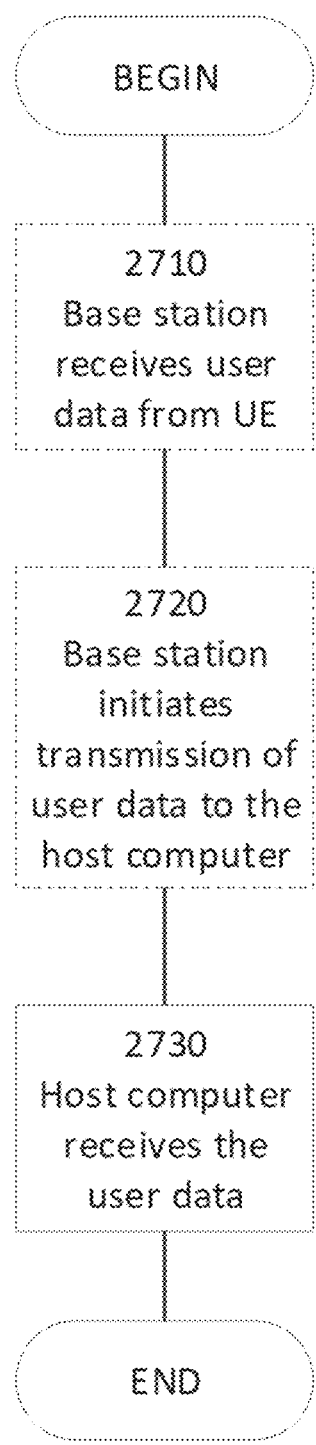
FIG. 27 is a flow chart illustrating methods implemented in a communication system including a host computer, a base station and a user equipment according to some embodiments of inventive concepts.

FIG. 26 is a flowchart illustrating a method implemented in a communication system including a host computer, a base station and a user equipment, in accordance with one embodiment. The communication system includes a host computer, a base station and a UE which may be those described with reference to FIGS. 22 and 23. For simplicity of the present disclosure, only drawing references to FIG. 26 will be included in this section. In step 2610 (which may be optional), the UE receives input data provided by the host computer. Additionally or alternatively, in step 2620, the UE provides user data. In substep 2621 (which may be optional) of step 2620, the UE provides the user data by executing a client application. In substep 2611 (which may be optional) of step 2610, the UE executes a client application which provides the user data in reaction to the received input data provided by the host computer. In providing the user data, the executed client application may further consider user input received from the user. Regardless of the specific manner in which the user data was provided, the UE initiates, in substep 2630 (which may be optional), transmission of the user data to the host computer. In step 2640 of the method, the host computer receives the user data transmitted from the UE, in accordance with the teachings of the embodiments described throughout this disclosure. FIG. 27 is a flowchart illustrating a method implemented in a communication system including a host computer, a base station and a user equipment, in accordance with some embodiments. The communication system includes a host computer, a base station and a UE which may be those described with reference to FIGS. 22 and 23. For simplicity of the present disclosure, only drawing references to FIG. 27 will be included in this section. In step 2710 (which may be optional), in accordance with the teachings of the embodiments described throughout this disclosure, the base station receives user data from the UE. In step 2720 (which may be optional), the base station initiates transmission of the received user data to the host computer. In step 2730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

At least some of the following abbreviations may be used in this disclosure. If there is an inconsistency between abbreviations, preference should be given to how it is used above. If listed multiple times below, the first listing should be preferred over any subsequent listing(s).

1x RTT CDMA2000 1xRadio Transmission Technology
3GPP 3rd Generation Partnership Project
5G 5th Generation
5GS 5G System
5GMM 5GS Mobility Management
5GSM 5GS Session Management
5QI 5G QoS Identifier
ABS Almost Blank Subframe
AMP Access and Mobility Management Function
AN Access Network
AN Access Node
ARQ Automatic Repeat Request
AS Access Stratum
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DNN Data Network Name
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
EPS Evolved Packet System
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR (corresponding to eNB in TE)
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NAS Non-Access Stratum
NB-IoT Narrowband. Internet of Things
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PDCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SMSoIP Short Message Service (SMS) over IP
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UAC Unified Access Control
UE User Equipment UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method of operating a user equipment (UE) for new radio (NR) unified access control, the method comprising:
   detecting an access attempt, wherein the access attempt is detected based on at least one of establishing a new protocol data unit (PDU) session, setting up a voice call, and setting up a video call;
   determining an access category from a plurality of access categories based on the access attempt and at least one access identity of the UE from a plurality of access identities to be applied for the access attempt;
   determining an establishment cause for the access attempt based on the access category determined from the plurality of access categories and based on the at least one access identity from the plurality of access identities; and
   transmitting a connection request message for the access attempt to a wireless communication network, wherein the connection request message includes the establishment cause determined based on the access category and based on the at least one access identity.

2. The method of claim 1, wherein the establishment cause comprises one of a plurality of establishment causes including mobile terminated access, emergency call, mobile originated signalling, mobile originated voice call, mobile originated data, and high priority access.

3. The method of claim 2, wherein the establishment cause is determined based on the access category and based on the at least one access identity as being one of the mobile terminated access, the emergency call, the mobile originated signalling, the mobile originated voice call, and/or the mobile originated data based on mapping the access category determined from the plurality of access categories to the establishment cause.

4. The method of claim 3, wherein the establishment cause is determined based on the mapping of the access category determined from the plurality of categories to the establishment cause and based on the at least one access identity for the UE being zero.

5. The method of claim 3, wherein the plurality of access categories comprises an operator defined access category.

6. The method of claim 5, wherein the operator defined access category is based on at least one of a data network name and a slice identifier.

7. The method of claim 5 further comprising:
   receiving the operator defined access category from the wireless communication network.

8. The method of claim 5, wherein determining the access category and the at least one access identity comprises determining that the operator defined access category is to be applied for the access attempt, and wherein the establishment cause is determined based on the mapping of the operator defined access category to the establishment cause.

9. The method of claim 8, wherein the operator defined access category is based on at least one of a data network name and a slice identifier, and wherein the mapping of the operator defined access category comprises mapping the operator defined access category to the establishment cause for mobile originated data.

10. The method of claim 2, wherein the establishment cause is determined as being high priority access based on the at least one access identity for the UE being non-zero.

11. The method of claim 1 further comprising:
    performing an access barring check for the access attempt based on the access category determined from the plurality of access categories and based on the at least one access identity from the plurality of access identities; and
    proceeding with the access attempt responsive to the access barring check authorizing the access attempt.

12. A user equipment (UE) for new radio (NR) unified access control, the UE comprising:
    a radio interface;
    processing circuitry coupled with the radio interface; and
    a device readable medium coupled with the processing circuitry, wherein the device readable medium comprises instructions that when executed by the processing circuitry cause the processing circuitry to:
       detect an access attempt, wherein the access attempt is detected based on at least one of establishing a new protocol data unit (PDU) session, setting up a voice call, and setting up a video call;
       determine an access category from a plurality of access categories based on the access attempt and at least one access identity of the UE from a plurality of access identities to be applied for the access attempt;
       determine an establishment cause for the access attempt based on the access category determined from the plurality of access categories and based on the at least one access identity from the plurality of access identities; and
       transmit a connection request message for the access attempt to a wireless communication network, wherein the connection request message includes the establishment cause determined based on the access category and based on the at least one access identity.

13. The UE of claim 12, wherein the establishment cause comprises one of a plurality of establishment causes including mobile terminated access, emergency call, mobile originated signalling, mobile originated voice call, mobile originated data, and high priority access.

14. The UE of claim 13, wherein the establishment cause is determined based on the access category and based on the at least one access identity as being one of the mobile terminated access, the emergency call, the mobile originated signalling, the mobile originated voice call, and/or the mobile originated data based on mapping the access category determined from the plurality of access categories to the establishment cause.

15. The UE of claim 14, wherein the establishment cause is determined based on mapping the access category determined from the plurality of categories to the establishment cause and based on the at least one access identity for the UE being zero.

16. The UE of claim 14, wherein the plurality of access categories comprises an operator defined access category.

17. The UE of claim 16, wherein the operator defined access category is based on at least one of a data network name and a slice identifier.

18. The UE of claim 16 wherein the device readable medium further comprises instructions that when executed by the processing circuitry cause the processing circuitry to:
    receive the operator defined access category from the wireless communication network.

* * * * *

UNITED STATES PATENT AND TRADEMARK OFFICE
CERTIFICATE OF CORRECTION

PATENT NO. : 11,665,618 B2
APPLICATION NO. : 16/957278
DATED : May 30, 2023
INVENTOR(S) : Wallentin et al.

It is certified that error appears in the above-identified patent and that said Letters Patent is hereby corrected as shown below:

In the Specification

In Column 1, Line 6, delete "PCT/M2019/050325," and insert -- PCT/IB2019/050325, --, therefor.

In Column 1, Line 64, delete "(SGV)." and insert -- (SGW). --, therefor.

In Column 2, Line 2, delete "RRC IDLE" and insert -- RRC_IDLE --, therefor.

In Column 2, Line 67, delete "may he" and insert -- may be --, therefor.

In Column 3, Line 48, delete "sonic" and insert -- some --, therefor.

In Column 3, Line 56, delete "is a is a flow chart" and insert -- is a flow chart --, therefor.

In Column 5, Line 24, delete "LE." and insert -- UE. --, therefor.

In Column 5, Line 36, delete "can he" and insert -- can be --, therefor.

In Column 6, Line 55, delete "New Radio 5G)" and insert -- New Radio (or 5G) --, therefor.

In Column 7, Line 9, delete "SGC)." and insert -- 5GC). --, therefor.

In Column 8, Line 15, delete "3GPP IS" and insert -- 3GPP TS --, therefor.

In Column 8, Line 16, delete "3GPP IS" and insert -- 3GPP TS --, therefor.

In Column 9, Line 16, delete "SQI" and insert -- 5QI --, therefor.

In Column 10, Line 8, delete "LIE" and insert -- LTE --, therefor.

Signed and Sealed this
Twenty-sixth Day of December, 2023

Katherine Kelly Vidal
*Director of the United States Patent and Trademark Office*

CERTIFICATE OF CORRECTION (continued)
U.S. Pat. No. 11,665,618 B2

In Column 10, Line 26, delete "UE," and insert -- LTE, --, therefor.

In Column 14, Line 7, delete "vet" and insert -- yet --, therefor.

In Column 14, Line 46, delete "UE," and insert -- LTE, --, therefor.

In Column 15, Line 30, delete ""Operator-specifics#8"." and insert -- "Operator-specific#8". --, therefor.

In Column 19, Line 37, delete "RATS)" and insert -- RATs) --, therefor.

In Column 19, Line 42, delete "LIE," and insert -- LTE, --, therefor.

In Column 26, Line 12, delete "UE," and insert -- LTE, --, therefor.

In Column 27, Line 62, delete "user identity (SIM/RUIM) module," and insert -- user identity module (SIM/RUIM), --, therefor.

In Column 28, Line 17, delete "URAN," and insert -- UTRAN, --, therefor.

In Column 28, Line 39, delete "a network," and insert -- a Wi-Fi network, --, therefor.

In Column 35, Line 12, delete "AMP" and insert -- AMF --, therefor.

In Column 35, Line 23, delete "CDMA Code Division Multiplexing Access" and insert -- CDMA Code Division Multiple Access --, therefor.

In Column 35, Line 43, delete "E-SMLC Evolved-Serving Mobile Location Centre".

In Column 35, Line 54, delete "in TE)" and insert -- in LTE) --, therefor.

In Column 36, Line 30, delete "PDCCH Physical Uplink Control Channel" and insert -- PUCCH Physical Uplink Control Channel --, therefor.

In Column 37, Line 7, delete "WCDMA Wide CDMA" and insert -- WCDMA Wideband CDMA --, therefor.

In Column 37, Line 8, delete "WLAN Wide Local Area Network" and insert -- WLAN Wireless Local Area Network --, therefor.

In the Claims

In Column 38, Line 66, in Claim 18, delete "network." and insert -- network through the radio interface. --, therefor.